United States Patent
Kim et al.

(10) Patent No.: US 8,224,260 B2
(45) Date of Patent: Jul. 17, 2012

(54) RADIO FREQUENCY SIGNAL TRANSMISSION/RECEPTION APPARATUS AND RADIO FREQUENCY SIGNAL TRANSMISSION/RECEPTION METHOD

(75) Inventors: Hong Teuk Kim, Gyeonggi-do (KR); Kwy Ro Lee, Seoul (KR); Sergey Sergeyev, Nizhny Novgorod (RU); Sergey Khvorov, Kirov region (RU); Alexander Belonozhkin, Nizhny Novgorod (RU)

(73) Assignee: LG Electronics Inc., Seoul (KR)

( * ) Notice: Subject to any disclaimer, the term of this patent is extended or adjusted under 35 U.S.C. 154(b) by 1214 days.

(21) Appl. No.: 11/635,562

(22) Filed: Dec. 8, 2006

(65) Prior Publication Data
US 2007/0173209 A1   Jul. 26, 2007

(30) Foreign Application Priority Data

| Jan. 23, 2006 | (KR) | 10-2006-0006938 |
| Jan. 23, 2006 | (KR) | 10-2006-0006939 |
| Mar. 23, 2006 | (KR) | 10-2006-0026606 |
| Aug. 23, 2006 | (KR) | 10-2006-0079912 |
| Aug. 23, 2006 | (KR) | 10-2006-0079914 |

(51) Int. Cl.
*H04B 1/46* (2006.01)
*H04B 1/04* (2006.01)

(52) U.S. Cl. ........ 455/78; 455/83; 455/84; 455/85; 455/86; 455/87; 455/118; 455/313; 455/318; 455/323

(58) Field of Classification Search .......... 455/78, 455/83, 84, 85, 86, 87, 118, 313, 318, 323
See application file for complete search history.

(56) References Cited

U.S. PATENT DOCUMENTS

| 5,444,863 | A * | 8/1995 | Torii .................. 455/83 |
| 5,802,463 | A * | 9/1998 | Zuckerman ............ 455/208 |
| 5,983,081 | A * | 11/1999 | Lehtinen ................ 455/76 |
| 6,272,329 | B1 * | 8/2001 | Sawchuk .............. 455/326 |
| 6,335,952 | B1 | 1/2002 | Lee et al. |
| 6,434,366 | B1 | 8/2002 | Harrison et al. |
| 6,510,309 | B1 * | 1/2003 | Thompson et al. ....... 455/78 |
| 2001/0049267 | A1 | 12/2001 | Takalo et al. |
| 2005/0164670 | A1 * | 7/2005 | Sorrells et al. .......... 455/323 |
| 2006/0035618 | A1 * | 2/2006 | Pleasant .................. 455/323 |

FOREIGN PATENT DOCUMENTS

| EP | 0 798 880 A2 | 10/1997 |
| GB | 2356319 A | 5/2001 |
| JP | 2005-124240 A | 5/2005 |
| KR | 1997-0031408 A | 6/1997 |
| KR | 2000-0002559 A | 1/2000 |
| KR | 2000-0071086 A | 11/2000 |
| KR | 2001-0059817 A | 7/2001 |
| KR | 2002-0047542 A | 6/2002 |
| KR | 2002-0074572 A | 10/2002 |
| KR | 2004-0046261 A | 6/2004 |
| RU | 2265278 C1 | 11/2005 |

* cited by examiner

*Primary Examiner* — Wen Huang
(74) *Attorney, Agent, or Firm* — Birch, Stewart, Kolasch & Birch, LLP

(57) ABSTRACT

A radio frequency (RF) signal transmission/reception apparatus and an RF signal transmission/reception method are disclosed. The RF signal transmission/reception apparatus is adapted to perform a transmission/reception duplex function using a bi-directional mixer at the IF band or baseband, not at the RF band. When a reception signal of the RF band is passed through the bi-directional mixer, it is converted into a signal in any one of the IF band and the baseband. Also, when a transmission signal in any one of the IF band and the baseband is passed through the bi-directional mixer, it is converted into a signal of the RF band.

2 Claims, 42 Drawing Sheets

FIG. 13

Tx,Rx Filter types for Full duplexing

| Rx filter types | Tx filter types |
|---|---|
| LPF | BPF,HPF |
| BPF | LPF,BPF,HPF |
| HPF | LPF,BPF |

RADIO FREQUENCY SIGNAL TRANSMISSION/RECEPTION APPARATUS AND RADIO FREQUENCY SIGNAL TRANSMISSION/RECEPTION METHOD

This application claims the priority benefit of Korean Application No. 10-2006-0006938 which is filed on Jan. 23, 2006, Korean Application No. 10-2006-0006939 which is filed on Jan. 23, 2006, Korean Application No. 10-2006-0026606 which is filed on Mar. 23, 2006, Korean Application No. 10-2006-0079912 which is filed on Aug. 23, 2006, and Korean Application No. 10-2006-0079914 which is filed on Aug. 23, 2006, which are hereby incorporated by reference as if fully set forth therein.

BACKGROUND OF THE INVENTION

1. Field of the Invention

The present invention relates to a radio frequency (RF) signal transmission/reception apparatus and a radio frequency signal transmission/reception method, and more particularly, to a radio frequency (RF) signal transmission/reception apparatus which has a simple structure and excellent signal transmission/reception performance, and a radio frequency signal transmission/reception method using the same.

2. Discussion of the Related Art

Nowadays, converged in a mobile phone are various wireless communication schemes, for example, wireless communication schemes such as global system for mobile communication (GSM), code division multiple access (CDMA) and wideband code division multiple access (WCDMA), wireless communication schemes such as wireless local area network (WLAN) and worldwide interoperability for microwave access (Wimax), wireless communication schemes such as ultra wideband (UWB) and BLUETOOTH, global positioning system (GPS)-based wireless communication schemes, and so forth. As a result, there is an increasing demand for a wireless transmission/reception chip capable of processing various communication schemes which is small in size, excellent in reception performance and low in power consumption. Moreover, the provision of many wireless communication services involves an increasing demand for a wireless transmission/reception chip that overcomes interference from external signals and is stable in wireless environments.

FIG. 1 shows an example of a radio frequency signal transmission/reception apparatus. As shown in this drawing, the conventional apparatus for transmitting and receiving a radio frequency (RF) signal comprises an RF duplexer 10 connected to an antenna, a reception signal processor 20 and transmission signal processor 30 connected in common to the RF duplexer 10, and a frequency synthesizer 40 and a modem 50 connected in common to the reception signal processor 20 and the transmission signal processor 30. The operation of the conventional radio frequency signal transmission/reception apparatus will hereinafter be described with reference to FIG. 1.

The RF duplexer 10 transmits or receives an RF signal such that it is passed with low loss between the antenna and the reception signal processor 20 or between the transmission signal processor 30 and the antenna.

The RF duplexer 10 includes an RF reception band pass filter and an RF transmission band pass filter. The RF reception band pass filter has one terminal connected to the antenna and the other terminal connected to the reception signal processor 20, and the RF transmission band pass filter has one terminal connected to the transmission signal processor 30 and the other terminal connected to the antenna. An RF signal passed through the antenna and reception signal processor 20 and an RF signal passed through the transmission signal processor 30 can be separated from each other to a very high frequency isolation degree based on characteristics of the pass filters included in the RF duplexer 10.

Accordingly, the RF duplexer 10 isolates an RF signal to be inputted to the reception signal processor 20 and an RF signal outputted from the transmission signal processor 30 from each other so that the RF signal transmission/reception apparatus can transmit and receive the RF signals at the same time.

The RF duplexer 10 may be made with a film bulk acoustic resonator (FBAR) filter, bulk acoustic wave (BAW) filter, dielectric filter, lumped LC filter, low temperature co-fired ceramic (LTCC) filter, or the like.

The reception signal processor 20 amplifies a signal received through the antenna and RF duplexer 10, performs a frequency conversion, channel filtering and variable gain control with respect to the amplified signal and outputs the resulting signal to the modem 50.

To this end, the reception signal processor 20 includes a low-noise amplifier 21, a first mixer 22, a first filter 23, and a first variable gain amplifier (VGA) 24.

The low-noise amplifier 21 amplifies the received signal, and the first mixer 22 down-converts the frequency of an RF signal from the low-noise amplifier 21 using an oscillation signal from the frequency synthesizer 40.

The first filter 23 filters an output signal from the first mixer 22 at an intermediate frequency (IF) band or baseband, and the first VGA 24 performs a variable amplification with respect to an IF band signal or baseband signal from the first filter 23 and outputs the resulting signal to the modem 50.

In order to transmit a signal received from the modem 50, the transmission signal processor 30 performs a variable amplification, channel filtering, frequency conversion and power amplification with respect to the received signal and outputs the resulting signal to the RF duplexer 10. To this end, the transmission signal processor 30 includes a second VGA 34, second filter 33, second mixer 32, and power amplifier (PA) 31.

The second VGA 34 performs the variable amplification with respect to the received signal, and the second filter 33 filters an output signal from the second VGA 34 at the IF band or baseband. The second mixer 32 up-converts the frequency of an output signal from the second filter 33, and the PA 31 amplifies the frequency-converted signal and outputs the amplified signal to the RF duplexer 10.

The frequency synthesizer 40 supplies an oscillation signal to each of the first mixer 22 and second mixer 32. To this end, the frequency synthesizer 40 includes a phase locked loop (PLL) circuit 41 and an oscillator 42.

The PLL circuit 41 determines a certain phase, and the oscillator 42 outputs an oscillation signal having a frequency based on the determined phase to each of the first mixer 22 and second mixer 32. In the following drawings including FIG. 1, "RF" means a signal of an RF band, "IF" means a signal of the IF band, and "BB" means a signal of the baseband.

FIG. 2 shows another example of the conventional RF signal transmission/reception apparatus using an RF switch. The RF signal transmission/reception apparatus of FIG. 2 comprises an RF filter 5, a switch 15, a reception signal processor 20, a transmission signal processor 30, a frequency synthesizer 40, and a modem 50.

The operations of the reception signal processor 20, the transmission signal processor 30, the frequency synthesizer 40 and the modem 50 are similar to those stated previously with reference to FIG. 1.

In the example of FIG. 2, the RF filter 5 filters signals of the RF band to be transmitted and received. The switch 15 transfers an RF signal from the RF filter 5 to the reception signal processor 20 or an RF signal from the transmission signal processor 30 to the RF filter 5.

The switch 15 may be implemented by an RF switch which is made with a field effect transistor (FET), PIN diode, or the like.

Accordingly, in the example of FIG. 2, the RF band signals can be processed in a half-duplex transmission manner through the switching of the switch 15.

The communication scheme which performs the transmission and reception simultaneously using the RF duplexer as in FIG. 1 is typically called a full-duplex scheme, and the communication scheme which performs any one of the transmission and reception at one time using the switch as in FIG. 2 is typically called a half-duplex scheme.

However, the conventional RF signal transmission/reception apparatus as in the example of FIG. 1 or FIG. 2 processes signals of the RF band to be transmitted and received, in a duplex manner using the RF duplexer or RF switch, possibly causing problems as follows.

When the RF band signals are processed in the duplex manner using the RF duplexer or RF switch, they may be subject to loss, resulting in a degradation in reception sensitivity. For compensation for the signal loss, it is necessary to raise signal power, causing an increase in power consumption.

Further, the conventional RF signal transmission/reception apparatus as in the example of FIG. 1 or FIG. 2 must have a bulky and costly RF duplexer or RF switch separately from an RF signal transmission/reception chip. Moreover, high-performance, complex RF circuits are required in the reception signal processor and the transmission signal processor, thereby making it difficult to design the circuits of the reception signal processor and the transmission signal processor and increasing the size of the RF signal transmission/reception apparatus. Furthermore, the transmission signal processor and the reception signal processor must also be separately provided, thereby increasing the volume of the RF signal transmission/reception apparatus and making the structure thereof complicated.

In addition, signal interference may occur between RF circuits in the chip of the conventional RF signal transmission/reception apparatus, resulting in a degradation in the entire circuit performance of the apparatus.

SUMMARY OF THE INVENTION

Accordingly, the present invention is directed to an RF signal transmission/reception apparatus and RF signal transmission/reception method that substantially obviate one or more problems due to limitations and disadvantages of the related art.

An object of the present invention is to provide an RF signal transmission/reception apparatus which is simple in structure and is able to reduce inter-signal interference, and an RF signal transmission/reception method using the same.

Another object of the present invention is to provide an RF signal transmission/reception apparatus which can be reduced in chip size and be small in output power consumption, and an RF signal transmission/reception method using the same.

Another object of the present invention is to provide an RF signal transmission/reception apparatus which has excellent wireless communication performance and is applicable to various wireless communication systems, and an RF signal transmission/reception method using the same.

Yet another object of the present invention is to provide an RF signal transmission/reception apparatus which can process baseband signals or IF band signals in a duplex manner to transmit and receive RF signals, and an RF signal transmission/reception method using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a radio frequency (RF) signal transmission/reception apparatus includes a frequency synthesizer for outputting an oscillation signal of a frequency, a signal transmitter for outputting a signal of a first frequency band included in any one of a baseband and an intermediate frequency (IF) band, a signal receiver for receiving a signal of a second frequency band included in any one of the baseband and the IF band and isolated from the first frequency band and a bi-directional mixer for converting the signal of the first frequency band outputted from the signal transmitter into a signal of an RF band and, at the same time, a reception signal of the RF band into the signal of the second frequency band using the oscillation signal outputted from the frequency synthesizer.

The signal transmitter may includes at least one of a first signal transmitter which transmits an inphase signal of the first frequency band and a second signal transmitter which transmits a quadrature signal of the first frequency band.

The signal receiver may includes at least one of a first signal receiver which receives an inphase signal of the second frequency band and a second signal receiver which receives a quadrature signal of the second frequency band.

The RF signal transmission/reception apparatus may further include an RF filter for filtering the signals of the RF band. The bi-directional mixer may be a double balanced mixer.

In another aspect of the present invention, the RF signal transmission/reception apparatus includes a frequency synthesizer for outputting an oscillation signal of a certain frequency, a signal transmitter for outputting a signal of a first frequency band included in any one of a baseband and an IF band, a signal receiver for receiving a signal of a second frequency band included in any one of the baseband and the IF band, a bi-directional mixer for converting the signal of the first frequency band outputted from the signal transmitter into a signal of an RF band and a reception signal of the RF band into the signal of the second frequency band using the oscillation signal outputted from the frequency synthesizer; and a switch for performing a switching operation to transfer the signal of the first frequency band outputted from the signal transmitter to the bi-directional mixer, or the signal of the second frequency band converted by the bi-directional mixer to the signal receiver.

The signal transmitter may includes at least one of a first signal transmitter which transmits an inphase signal of the first frequency band and a second signal transmitter which transmits a quadrature signal of the first frequency band.

The signal receiver may includes at least one of a first signal receiver which receives an inphase signal of the second frequency band and a second signal receiver which receives a quadrature signal of the second frequency band.

The RF signal transmission/reception apparatus may further include an RF filter for filtering the signals of the RF band. The bi-directional mixer may be a double balanced mixer.

The RF signal transmission/reception apparatus may includes a frequency synthesizer for outputting an oscillation signal of a certain frequency, a signal transmitter for outputting a signal of a first frequency band, a signal receiver for receiving a signal of a second frequency band isolated from the first frequency band and a bi-directional mixer for converting the signal of the first frequency band outputted from the signal transmitter into a signal of an RF band and, at the same time, a reception signal of the RF band into the signal of the second frequency band using the oscillation signal outputted from the frequency synthesizer.

The signal receiver may include a low pass filter for passing only the second frequency band included in a baseband, and the signal transmitter comprises a band pass filter for passing only the first frequency band included in an IF band.

The signal receiver may include a low pass filter for passing only the second frequency band included in a baseband, and the signal transmitter comprises a high pass filter for passing only the first frequency band included in an IF band.

The signal receiver may include a band pass filter for passing only the second frequency band included in an IF band, and the signal transmitter comprises a low pass filter for passing only the first frequency band included in a baseband.

The signal receiver may include a first band pass filter for passing only the second frequency band included in an IF band, and the signal transmitter comprises a second band pass filter for passing only the first frequency band included in the IF band.

The signal receiver may include a band pass filter for passing only the second frequency band included in an IF band, and the signal transmitter comprises a high pass filter for passing only the first frequency band included in the IF band.

The signal receiver may include a high pass filter for passing only the second frequency band included in an IF band, and the signal transmitter comprises a low pass filter for passing only the first frequency band included in a baseband.

The signal receiver may include a high pass filter for passing only the second frequency band included in an IF band, and the signal transmitter comprises a band pass filter for passing only the first frequency band included in the IF band.

Therefore, a transmission signal and a reception signal can be isolated from each other through filtering when the signals are transmitted and received using the baseband and the IF band.

In another aspect of the present invention, the RF signal transmission/reception apparatus includes a frequency synthesizer for outputting an oscillation signal of a certain frequency, a signal transmitter for modulating and outputting a signal of a frequency band included in any one of a baseband and an IF band, a signal receiver for receiving a signal of a frequency band included in any one of a baseband and an IF band, a bi-directional mixer for converting the signal of the frequency band outputted from the signal transmitter into a signal of an RF band and, at the same time, a reception signal of the RF band into the signal of the frequency band received by the signal receiver using the oscillation signal outputted from the frequency synthesizer; and a switch for performing a switching operation to transfer the signal of the frequency band outputted from the signal transmitter to the bi-directional mixer or the signal of the frequency band converted by the bi-directional mixer to the signal receiver.

In another aspect of the present invention, the RF signal transmission/reception apparatus includes a frequency synthesizer for outputting an oscillation signal of a certain frequency, a bi-directional mixer for converting a reception signal of an RF band into a first signal in any one of a baseband and an IF band using the oscillation signal outputted from the frequency synthesizer and outputting the converted first signal, a first signal selector for selecting any one of the first signal outputted from the bi-directional mixer and a fourth signal to be transmitted, a modem for receiving and demodulating a third signal processed from the first signal, and modulating and outputting a second signal in any one of the baseband and an IF band, a second signal selector for selecting any one of the second signal outputted from the modem and the third signal and a signal transmitter/receiver unit for processing the second signal selected by the second signal selector to output the fourth signal, or processing the first signal selected by the first signal selector to output the third signal, wherein the bi-directional mixer converts the reception signal into the first signal and, at the same time, the fourth signal into a signal of the RF band.

The signal transmitter/receiver unit may includes a low-noise amplifier for amplifying the first signal selected by the first signal selector, a filter for filtering an output signal from the low-noise amplifier and a variable gain amplifier for variably amplifying an output signal from the filter and outputting the amplified signal as the third signal.

The signal transmitter/receiver unit may includes a low-noise amplifier for amplifying the second signal selected by the second signal selector, a filter for filtering an output signal from the low-noise amplifier and a variable gain amplifier for variably amplifying an output signal from the filter and outputting the amplified signal as the fourth signal.

An RF signal transmission/reception apparatus includes a frequency synthesizer for outputting an oscillation signal of a certain frequency, a bi-directional mixer for converting a reception signal of an RF band into a first signal in any one of a baseband and an IF band using the oscillation signal outputted from the frequency synthesizer and outputting the converted first signal, a modem for receiving and demodulating a third signal processed from the first signal, and modulating and outputting a second signal of any one of the baseband and an IF band and a signal transmitter/receiver unit for processing the second signal outputted from the modem to output a fourth signal, or processing the first signal outputted from the bi-directional mixer to output the third signal, wherein the bi-directional mixer converts the reception signal of the RF band into the first signal and, at the same time, the fourth signal into a signal of the RF band.

The signal transmitter/receiver unit includes a first amplifier for amplifying the first signal outputted from the bi-directional mixer, a first signal selector for selecting an output signal from the first amplifier, of the output signal from the first amplifier and the second signal outputted from the modem, a filter for filtering the signal selected by the first signal selector, a second amplifier for performing a variable-gain amplification with respect to an output signal from the filter to output the third signal and a second signal selector for performing a switching operation to transfer the third signal outputted from the second amplifier to the modem.

Therefore, a half-duplex function can be performed at the baseband or IF band to transmit and receive RF signals.

The signal transmitter/receiver unit may include a first signal selector for selecting the second signal outputted from the modem, of the first signal outputted from the bi-directional mixer and the second signal, a filter for filtering the second signal selected by the first signal selector, a second amplifier for performing a variable-gain amplification with respect to an output signal from the filter to output the fourth signal and a second signal selector for performing a switching operation to transfer the fourth signal outputted from the second amplifier to the bi-directional mixer.

In another aspect of the present invention, an RF signal transmission method includes modulating a signal to be transmitted, filtering the modulated signal to output a signal of a first frequency band included in any one of a baseband and an IF band, converting only the signal of the first frequency band, of signals of a frequency band including the first frequency band and a second frequency band isolated from the first frequency band, into a signal of an RF band and transmitting the signal of the RF band.

In another aspect of the present invention, the RF signal reception method includes receiving a signal of the RF band, converting the received RF band signal into a signal of a second frequency band included in any one of a baseband and IF band, filtering signals of a frequency band including the second frequency band and a first frequency band isolated from the second frequency band to pass only the signal of the second frequency band and demodulating the signal of the second frequency band.

In another aspect of the present invention, the RF signal transmission/reception method includes receiving a signal of an RF band, modulating and outputting a signal of a first frequency band included in any one of a baseband and an IF band and converting the received RF band signal into a signal of a second frequency band included in any one of the baseband and an IF band and, at the same time, the signal of the first frequency band into a signal of the RF band.

In another aspect of the present invention, the RF signal transmission method includes modulating and outputting a signal of a frequency band included in a baseband and an IF band, selecting the modulated signal, of a signal in any one of the baseband and the IF band into which a received signal of an RF band is converted, and the modulated signal, converting the selected signal into a signal of the RF band; and transmitting the converted RF band signal.

In another aspect of the present invention, the RF signal transmission method includes receiving a signal of an RF band, converting the received RF band signal into a signal of a frequency band included in any one of a baseband and an IF band, selecting the converted signal, of the converted signal and a transmission signal of a frequency band included in any one of the baseband and IF band and demodulating the selected signal.

In another aspect of the present invention, the RF signal transmission method includes receiving a first signal of an RF band, modulating a transmission signal and outputting the modulated signal as a second signal contained in any one of a baseband and an IF band, converting the first signal of the RF band into a signal belonging to any one of the baseband and the IF band if the first signal is selected, of the first signal and the second signal contained in any one of the baseband and the IF band, and converting the second signal into a signal of the RF band if the second signal is selected and demodulating the signal converted from the first signal, and transmitting the RF band signal converted from the second first signal.

In another aspect of the present invention, the RF signal transmission method includes receiving a signal of an RF band and outputting it as a first signal in any one of a baseband and an IF band, modulating a signal to be transmitted and outputting it as a second signal in any one of the baseband and the IF band, selecting any one of the first signal and the second signal, performing a signal processing including an amplification and filtering with respect to the selected signal, switching and outputting the processed signal according to a result of the selection and demodulating the outputted signal if the outputted signal is the signal processed from the first signal, and converting the outputted signal into a signal of the RF band if the outputted signal is the signal processed from the second signal.

Therefore, a reception signal and a transmission signal can be processed in a common block, thereby significantly reducing the volume of the RF signal transmission/reception apparatus. And a reception signal and a transmission signal can be processed partially in common, thereby making it possible to miniaturize the RF signal transmission/reception apparatus with an efficient structure.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 13 is a table illustrating types of filters which can be provided in the embodiment of FIG. 10;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereafter, an "RF transmission/reception band" refers to, in RF signal reception, the frequency band of an RF signal before the frequency of the signal is converted, after the RF signal is received, and, in RF signal transmission, the frequency band of an RF signal to be transmitted after the frequency of the signal is converted.

Also, hereinafter, an "IF band" refers to all frequency bands between the RF transmission/reception band and a baseband (also called a zero IF band).

Figure 1:
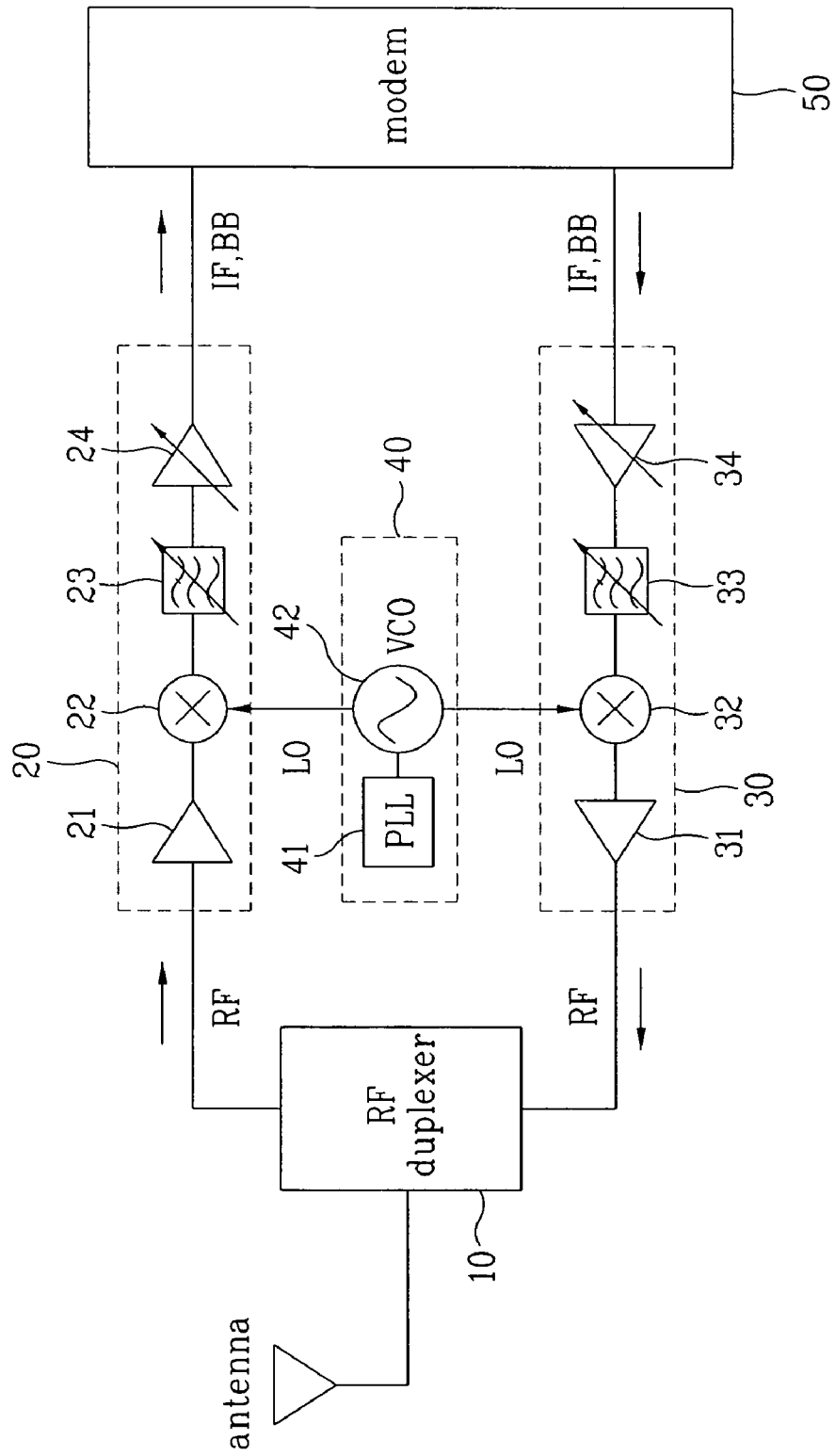
FIG. 1 is a block diagram showing an example of a related RF signal transmission/reception apparatus.
Figure 2:
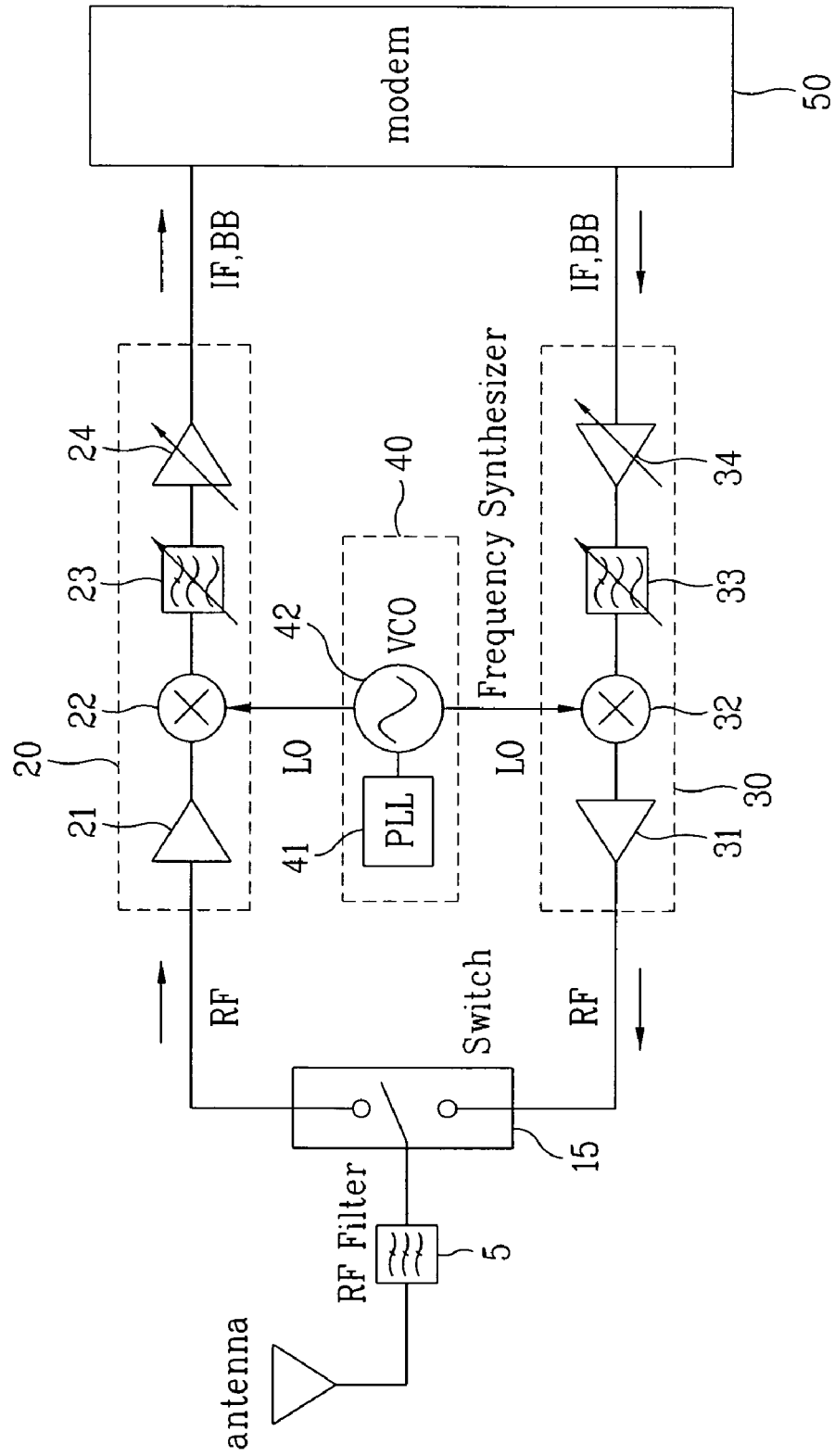
FIG. 2 is a block diagram showing another related example of the RF signal transmission/reception apparatus.
Figure 3:
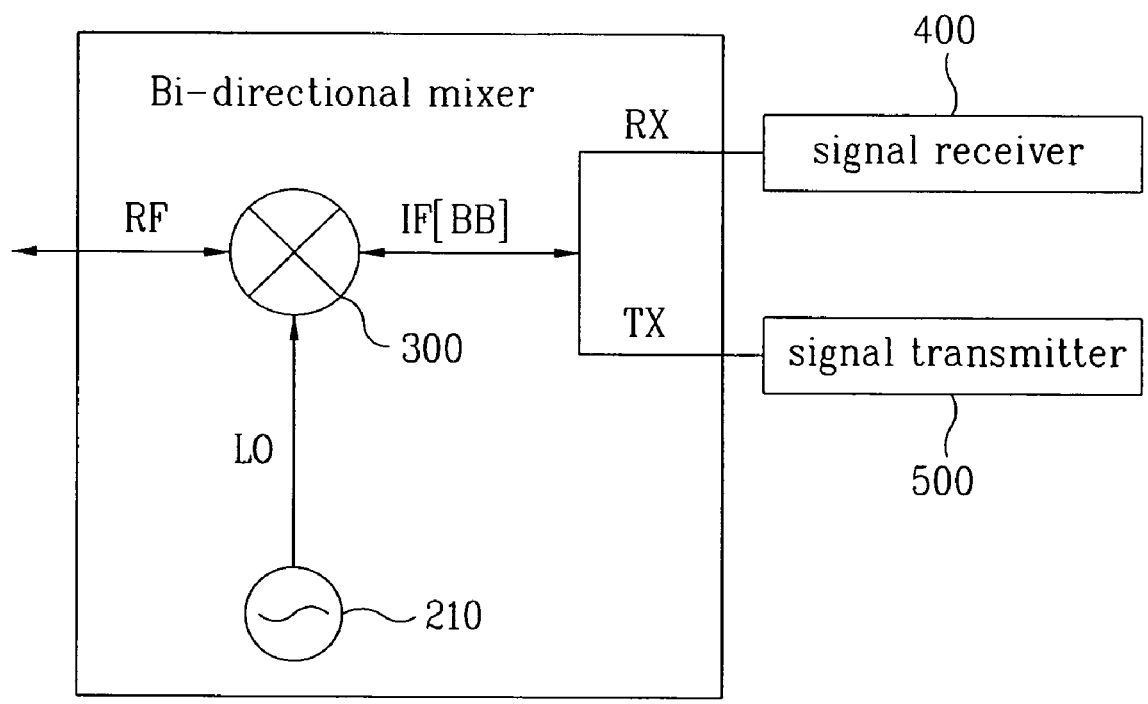
FIG. 3 shows an embodiment of an RF signal transmission/reception apparatus according to the present invention.

FIG. 3 shows an embodiment of an RF signal transmission/reception apparatus according to the present invention. The embodiment of the RF signal transmission/reception apparatus according to the present invention will hereinafter be described with reference to FIG. 3.

In the present embodiment, the RF signal transmission/reception apparatus is adapted to perform a transmission/reception duplex function at the IF band or baseband, not at the RF band. To this end, in this embodiment, the RF signal transmission/reception apparatus comprises a bi-directional mixer 300 for converting a signal in any one of the IF band and the baseband (or zero IF band) into a signal of the RF band, and conversely converting a signal of the RF band into a signal in any one of the IF band and the baseband.

The bi-directional mixer 300 receives an oscillation signal of a certain frequency from an oscillator 210 and converts a signal of the RF band into a signal of any one of the IF band and the baseband and, at the same time, vice versa, using the received oscillation signal. As a result, when a reception signal of the RF band is passed through the bi-directional mixer 300, it is converted into a signal in any one of the IF band and the baseband. Also, when a transmission signal of any one of the IF band and the baseband is passed through the bi-directional mixer 300, it is converted into a signal of the RF band.

A signal transmitter 500 processes a transmission signal and outputs the processed signal in any one of the IF band and the baseband to the bi-directional mixer 300. A signal receiver 400 receives and processes a signal in any one of the IF band and baseband.

The RF signal transmission/reception apparatus according to the present invention may process differential transmission and reception signals. Here, the differential signals mean signals having a phase difference therebetween, for example, an inphase signal and a quadrature signal which are orthogonal to each other.

Figure 4:
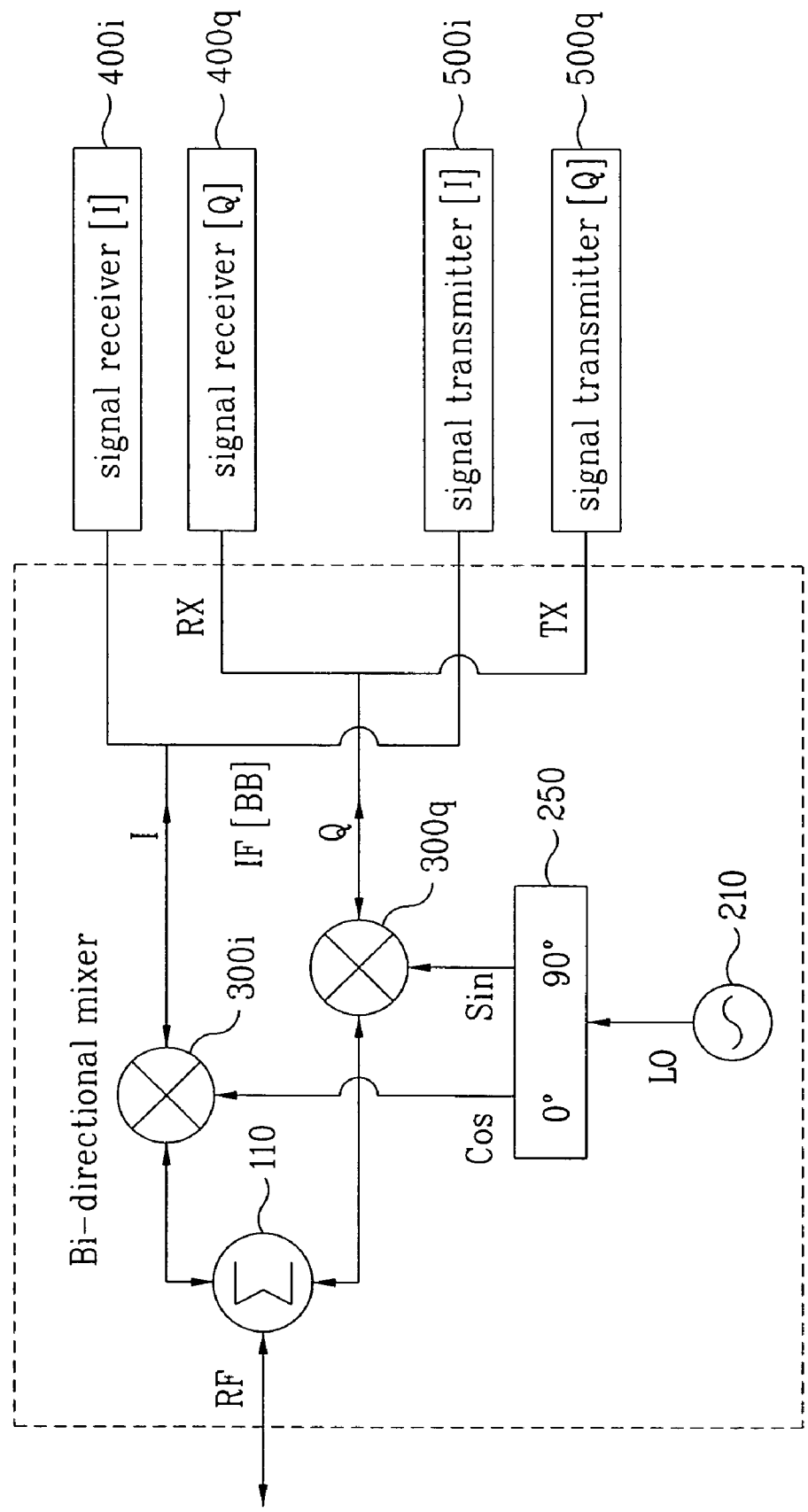
FIG. 4 shows another embodiment of an RF signal transmission/reception apparatus according to the present invention.

FIG. 4 shows an alternative embodiment of the RF signal transmission/reception apparatus according to the present invention, which can process transmission and reception signals in the form of inphase and quadrature signals. In the present embodiment, the RF signal transmission/reception apparatus is adapted to separate transmission signals and reception signals of the IF band or baseband into inphase signals and quadrature signals, respectively, and bi-directionally transmit and receive the separated signals at the same time.

A phase shifter 250 receives an oscillation signal from an oscillator 210 and outputs two oscillation signals orthogonal to each other. A first bi-directional mixer 300i bi-directionally converts an inphase signal of the RF band and an inphase signal in any one of the IF band and the baseband at the same time using any one of the oscillation signals from the phase shifter 250.

A second bi-directional mixer 300q bi-directionally converts a quadrature signal of the RF band and a quadrature signal in any one of the IF band or the baseband at the same time using the other oscillation signal from the phase shifter 250.

A summation unit 110 sums an inphase signal of the RF band from the first bi-directional mixer 300i and a quadrature signal of the RF band from the second bi-directional mixer 300q in order to generate an RF single-ended signal.

A first signal receiver 400i receives an inphase signal in any one of the IF band and the baseband from the first bi-directional mixer 300i, and a second signal receiver 400q receives a quadrature signal of the IF band (or baseband) from the second bi-directional mixer 300q.

A first signal transmitter 500i transmits an inphase signal of the IF band (or baseband) to the first bi-directional mixer 300i, and a second signal transmitter 500q transmits a quadrature signal of the IF band (or baseband) to the second bi-directional mixer 300q.

Therefore, the RF signal transmission/reception apparatus according to the present invention can perform the duplex function using signals in any one of the IF band and the baseband.

Figure 5:
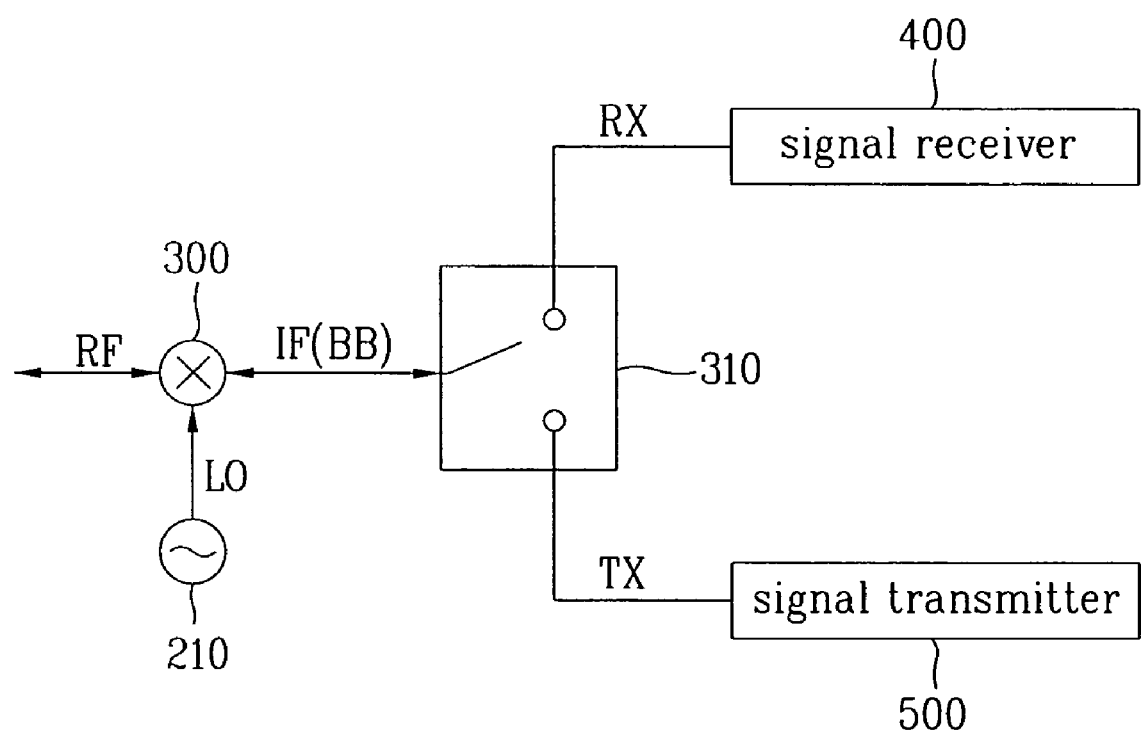
FIG. 5 shows another embodiment of an RF signal transmission/reception apparatus according to the present invention.

FIG. 5 shows another embodiment of an RF signal transmission/reception apparatus according to the present invention. The embodiment of the RF signal transmission/reception apparatus according to the present invention will hereinafter be described with reference to FIG. 5.

In the present embodiment, the RF signal transmission/reception apparatus is adapted to perform a half duplex function at the IF band or the baseband, not at the RF band. In this embodiment, the RF signal transmission/reception apparatus comprises a bi-directional mixer 300 for converting a signal in any one of the IF band and the baseband into a signal of the RF band, or conversely converting a signal of the RF band into a signal in any one of the IF band and the baseband. And, the embodiment of the RF signal transmission/reception apparatus has further a switch 310, a signal receiver 400, and a signal transmitter 500. The switch 310 transfers the output signal from the bi-directional mixer 300 to a signal receiver 400 or an output signal from the signal transmitter 500 to the bi-directional mixer 300. The functions of the signal receiver 400 and the signal transmitter are same as described in FIGS. 3 and 4.

Figure 6:
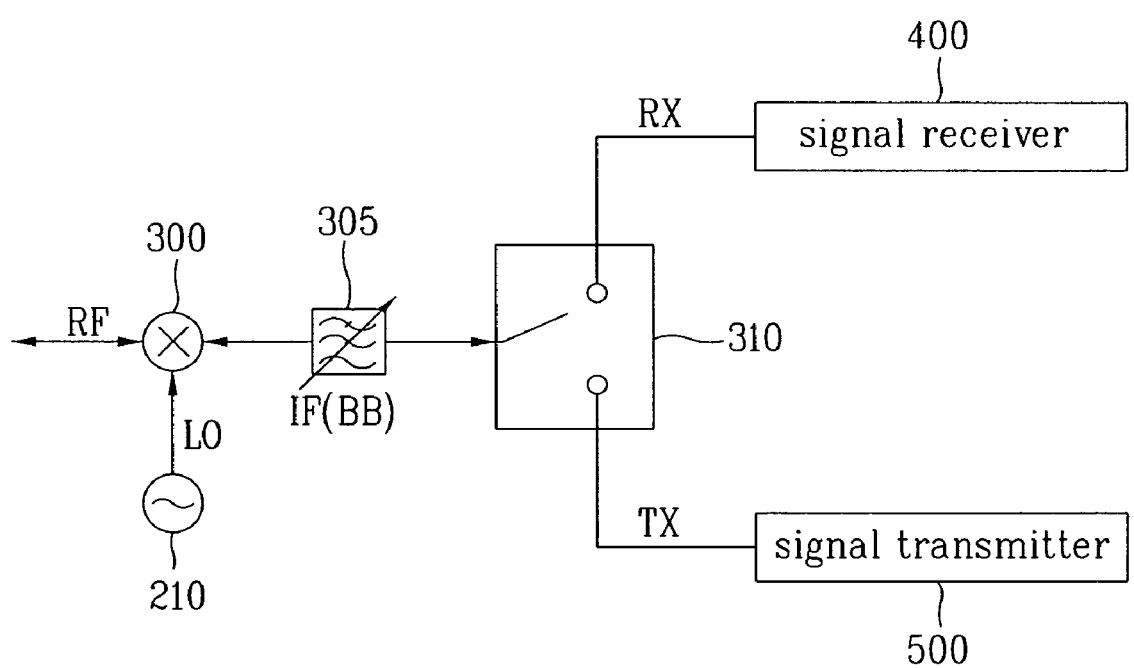
FIG. 6 shows another embodiment of an RF signal transmission/reception apparatus according to the present invention.

FIG. 6 shows another embodiment of the present invention. The embodiment shown in FIG. 6 includes a oscillator 210, a bi-directional mixer 300, a filter 305, a switch 310, a signal receiver 400, and a signal transmitter 500. The embodiment shown in FIG. 6 further includes the filter 305 the embodiment shown in FIG. 5. The filter 305 filters a signal, which is converted by the bi-directional mixer 300, and another signal, which is outputted by the signal transmitter 500 and passed by the switch 310. The signals filtered by the filter 305 are in any one of the IF band and the baseband.

From embodiments in FIGS. 5 and 6, the RF signal transmission/reception apparatus according to the present invention can perform the half duplex function using signals in any one of the IF band and the baseband. The operations of various embodiments of the RF signal transmission/reception apparatus according to the present invention, using the aforementioned bi-directional mixers, will hereinafter be described in detail.

Figure 7:
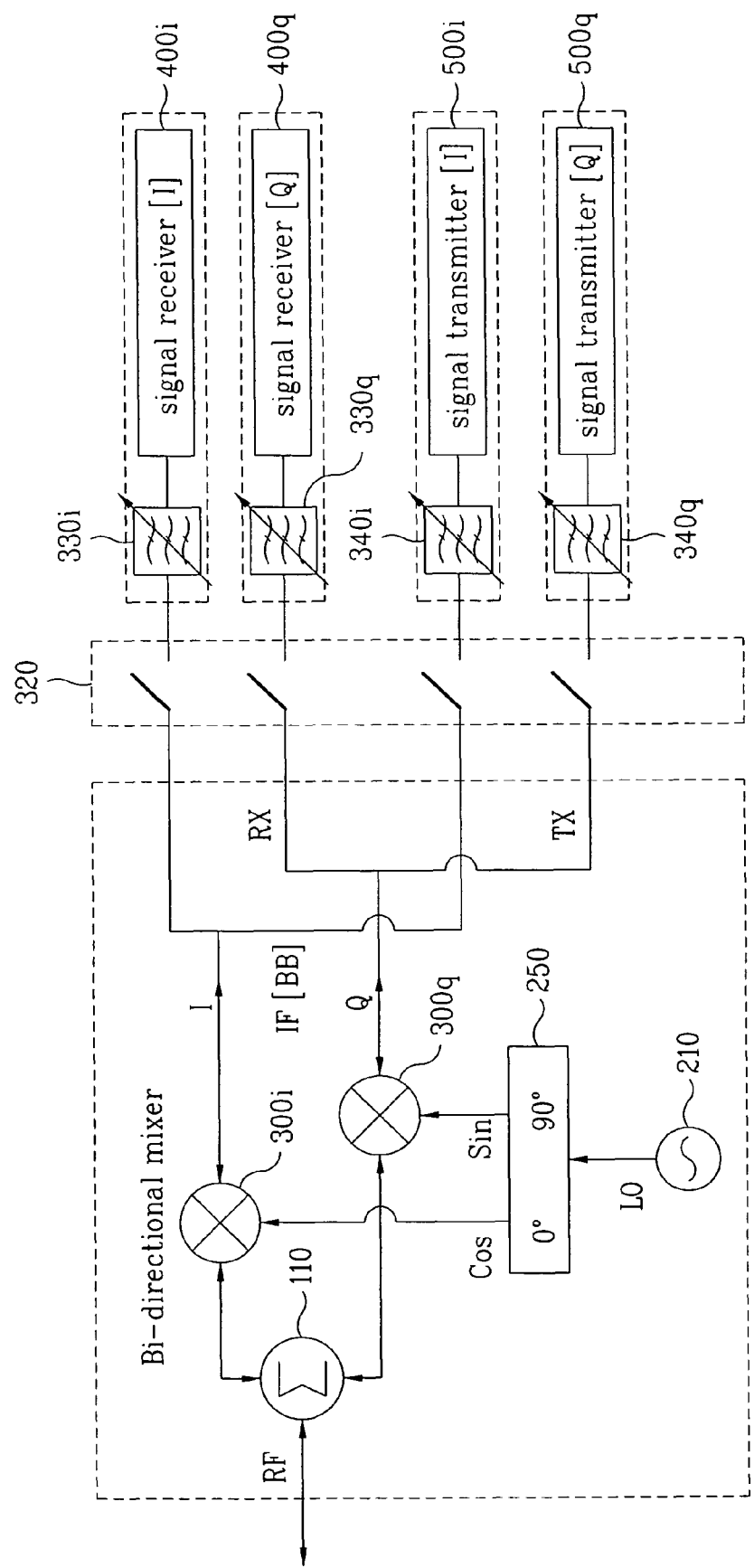
FIG. 7 is a block diagram showing another embodiment of the RF signal transmission/reception apparatus according to the present invention.

FIG. 7 is a block diagram showing another embodiment of the RF signal transmission/reception apparatus according to the present invention, implementing the half-duplex function and processing differential signals. The embodiment of FIG. 7 is an example of the RF signal transmission/reception apparatus which is capable of transmitting and receiving inphase signals and quadrature signals in a half-duplex manner.

The embodiment in FIG. 7 includes an oscillator 210, a phase shifter 250, a first bi-directional mixer 300i, a second bi-directional mixer 300q, a switching circuit 320, a first signal receiver 400i, a second signal receiver 400q, a first signal transmitter 500i, and a second signal transmitter 500q.

An inphase signal line connected to a first bi-directional mixer 300i and a quadrature signal line connected to a second bi-directional mixer 300q are selectively connected to a first signal receiver 400i, second signal receiver 400q, first signal transmitter 500i, and second signal transmitter 500q according to ON/OFF operations of switches included in a switching circuit 320.

In the embodiment of FIG. 7, the RF signal transmission/reception apparatus may further include at least one of a first reception filter 330i, a second reception filter 330q, a first transmission filter 340i and a second transmission filter 340q shown in FIG. 7.

The first reception filter 330i filters an inphase signal in any one of the IF band and the baseband selected by the switching circuit 320 and outputs the filtered inphase signal to the first signal receiver 400i.

The first transmission filter 340i filters an inphase signal of any one of the IF band and the baseband outputted from the signal transmitter 500i and outputs the filtered inphase signal to the switching circuit 320.

The second reception filter 330q and second transmission filter 340q function in the same manner as the first reception filter 330i and first transmission filter 340i, respectively, with the exception of filtering quadrature signals.

The reception filters 330i and 330q, and the transmission filters 340i and 340q may filter signals of the same frequency band or different frequency bands.

Figure 8:
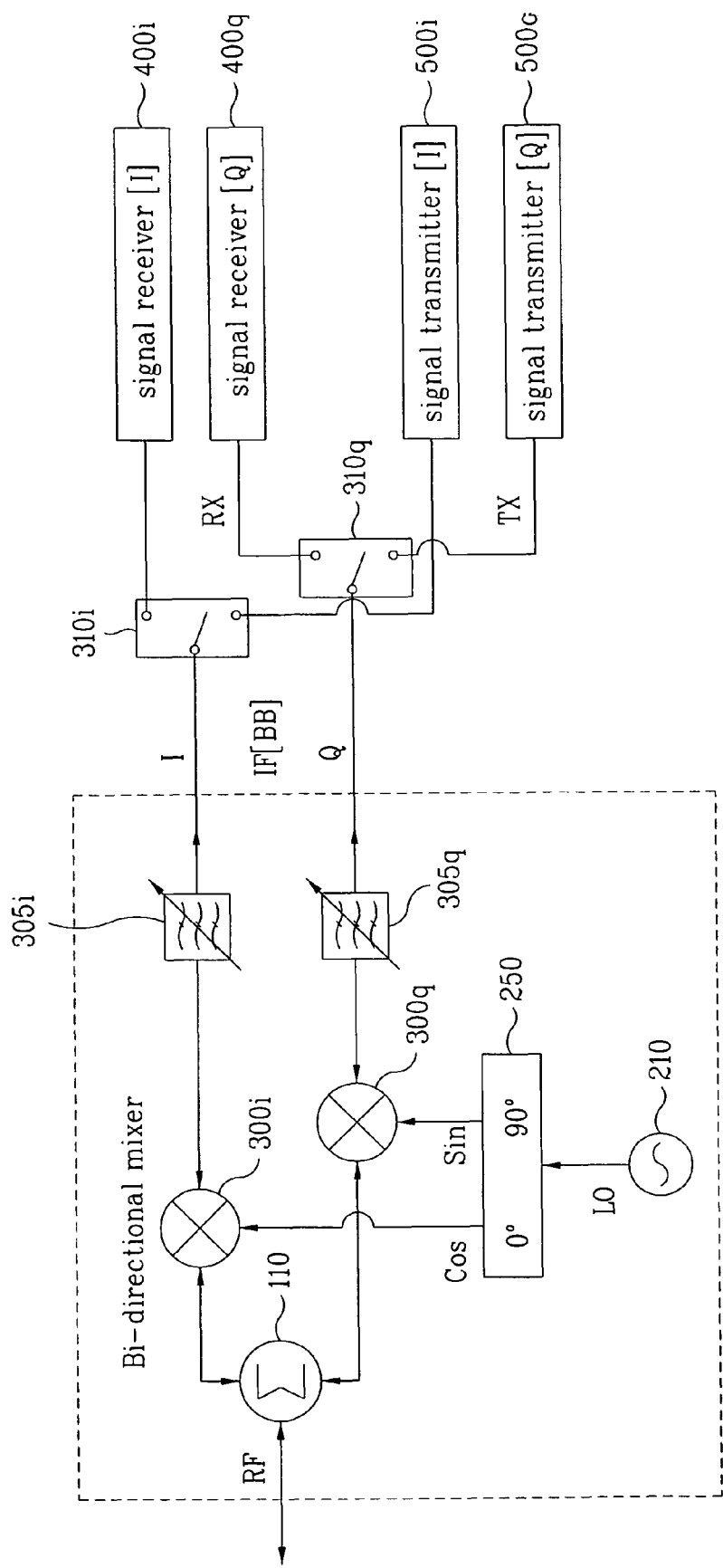
FIG. 8 is a block diagram showing another embodiment of the RF signal transmission/reception apparatus according to the present invention.

FIG. 8 is a block diagram showing another embodiment of the RF signal transmission/reception apparatus according to the present invention, implementing the half-duplex function. This embodiment of the RF signal transmission/reception apparatus according to the present invention will hereinafter be described with reference to FIG. 8. This embodiment of FIG. 8 is similar to the embodiment of FIG. 7.

A first switch 310i is provided to selectively connect an inphase signal line connected to the first bi-directional mixer 300i, to any one of the first signal receiver 400i or first signal transmitter 500i.

A second switch 310q is also provided to selectively connect a quadrature signal line connected to the second bi-directional mixer 300q, to the second signal receiver 400q or second signal transmitter 500q.

The first switch 310i and the second switch 310q act to selectively transmit and receive inphase signals and quadrature signals contained in any one of the IF band and baseband, respectively. Therefore, in the embodiment of FIG. 8, the half-duplex function can be implemented at the baseband or IF band.

In the embodiment of FIG. 8, the RF signal transmission/reception apparatus may further include a first transmission/reception filter 305i for filtering inphase signals between the first bi-directional mixer 300i and the first switch 310i, and a second transmission/reception filter 305q for filtering quadrature signals between the second bi-directional mixer 300q and the second switch 310q. The first transmission/reception filter 305i and the second transmission/reception filter 305q may filter signals of the same frequency band.

Next, a detailed description will be given of the operations of various embodiments of the RF signal transmission/reception apparatus and the RF signal transmission/reception method according to the present invention.

Figure 9:
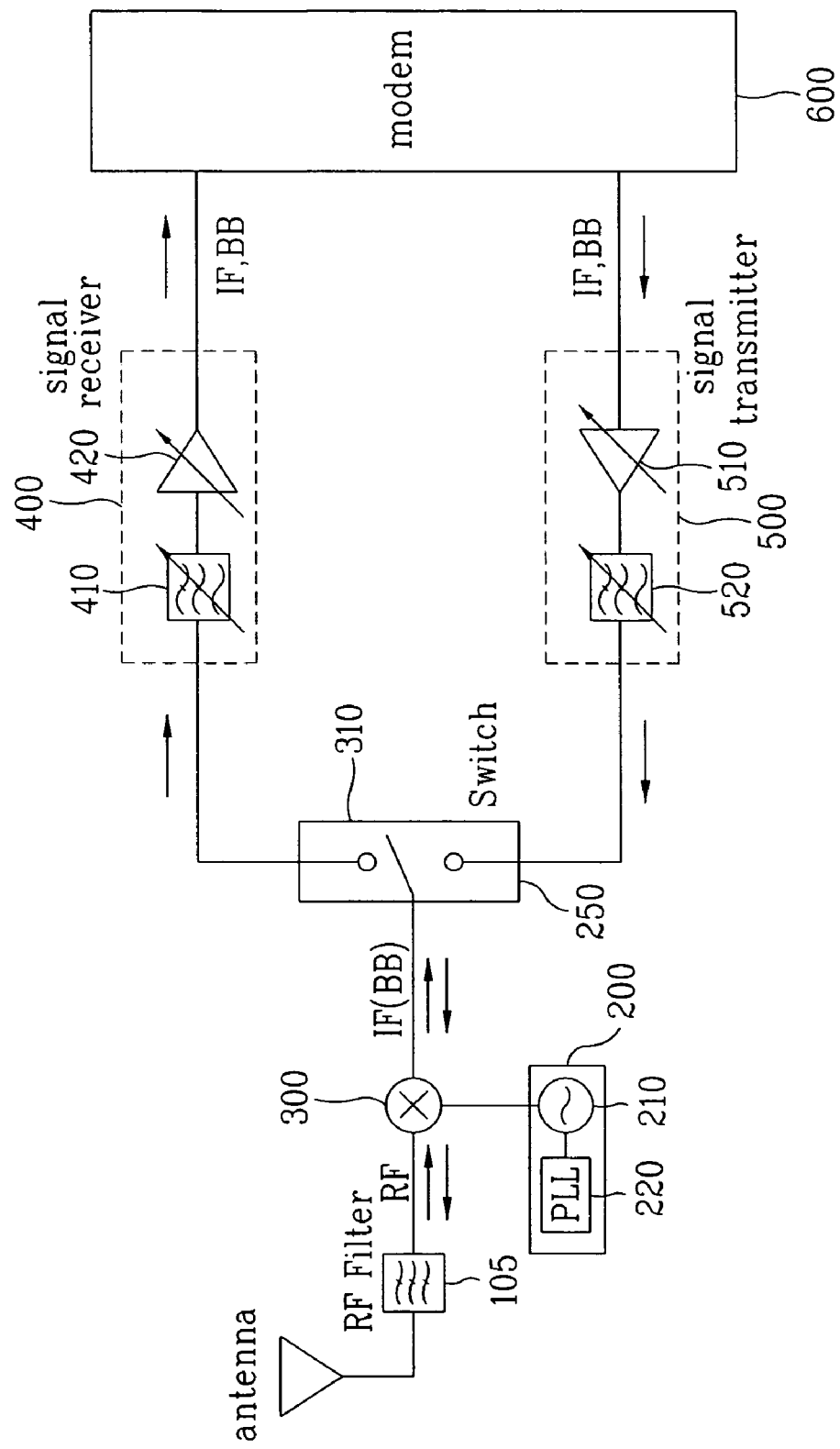
FIG. 9 is a block diagram showing another embodiment of the RF signal transmission/reception apparatus according to the present invention.

FIG. 9 is a block diagram showing another embodiment of the RF signal transmission/reception apparatus according to the present invention. The operation of this embodiment of the RF signal transmission/reception apparatus according to the present invention will hereinafter be described with reference to FIG. 9.

The present embodiment in FIG. 9 includes an RF filter 105, a frequency synthesizer 200, a bi-directional mixer 300, a switch 310, a signal receiver 400, a signal transmitter 500, and a modem 600.

The RF filter 105 filters an input signal to remove interference from signals of bands other than the RF transmission/reception band from the input signal.

The frequency synthesizer 200 outputs an oscillation signal with a certain frequency. To this end, the frequency synthesizer 200 includes a PLL circuit 220 and an oscillator 210.

The bi-directional mixer 300 converts a transmission signal of a first frequency band included in any one of the baseband and the IF band into a signal of the RF band.

At the same time, the bi-directional mixer 300 converts a reception signal of the RF band into a signal of a second frequency band included in any one of the baseband and IF band.

The switch 310 transfers an output signal from the bi-directional mixer 300 to the signal receiver 400 or an output signal from the signal transmitter 500 to the bi-directional mixer 300 in response to a control signal.

The signal receiver 400 passes only a signal of a reception band from an output signal from the bi-directional mixer 300. To this end, the signal receiver 400 includes a first filter 410 and a first VGA 420.

The first filter 410 passes only the signal of the reception band, and the first VGA 420 variably amplifies an output signal from the first filter 410 and outputs the resulting signal to the modem 600.

The signal transmitter 500 includes a second VGA 510 and a second filter 520. The second VGA 510 variably amplifies an output signal from the modem 600, and the second filter 520 filters an output signal from the second VGA 510 into a signal of a transmission band.

The reception band of the signal receiver 400 and the transmission band of the signal transmitter 500 may be the same or be isolated from each other. Even though the transmission band and the reception band are the same, the transmission signal and the reception signal can be isolated from each other by virtue of the switching of the switch.

The RF filter 105 is optional in the present invention since it may not be provided in an environment with little interference from external signals.

The embodiments based on the filter characteristics are described in details hereafter. For description of the operations of, the processing of a single-ended signal will hereinafter be taken as an example, although the operations are similarly applied to the processing of differential signals.

Figure 10:
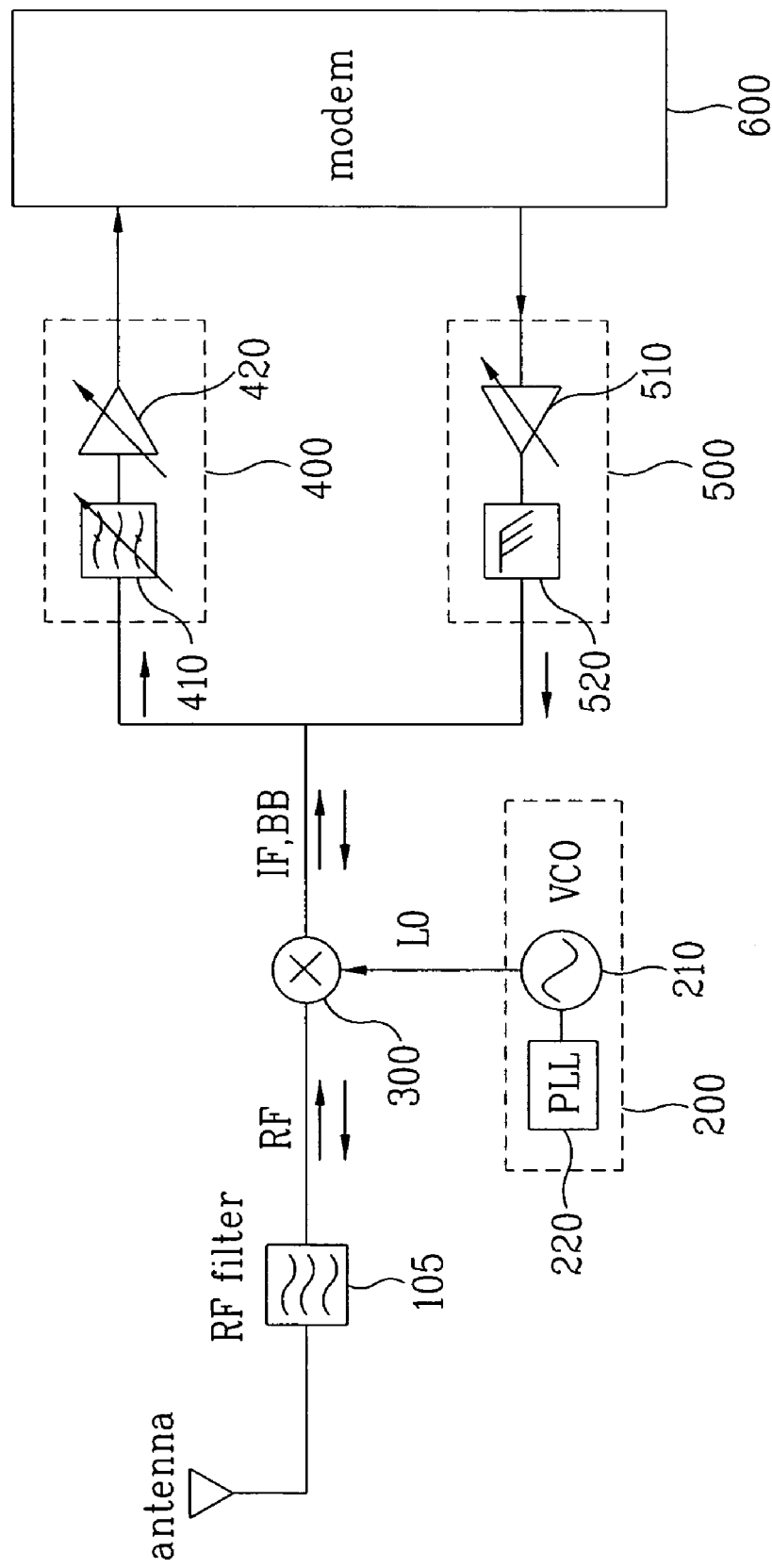
FIG. 10 is a block diagram showing another embodiment of the RF signal transmission/reception apparatus according to the present invention.

FIG. 10 is a block diagram showing another embodiment of the RF signal transmission/reception apparatus according to the present invention. In the present embodiment, the RF signal transmission/reception apparatus comprises an RF filter 105, a frequency synthesizer 200, a bi-directional mixer 300, a signal receiver 400, a signal transmitter 500, and a modem 600.

The operation of this embodiment of the RF signal transmission/reception apparatus according to the present invention, which is capable of performing a full-duplex function, will hereinafter be described with reference to FIG. 10.

The RF filter 105 filters a signal inputted to the RF filter in order to remove interference from signals of bands other than the RF transmission/reception band.

The frequency synthesizer 200 outputs an oscillation signal with a certain frequency. To this end, the frequency synthesizer 200 includes a PLL circuit 220 and an oscillator 210.

The bi-directional mixer 300 converts a reception signal of the RF band into a signal in any one of the baseband and the IF band, and also converts a transmission signal in any one of the baseband and the IF band into a signal of the RF band.

The signal receiver 400 passes only a signal of a reception band from an output signal from the bi-directional mixer 300. To this end, the signal receiver 400 includes a first filter 410 and a first VGA 420.

The first filter 410 filters an input signal to pass only the signal of the reception band. The first VGA 420 variably amplifies a signal outputted from the first filter 410 and outputs the amplified signal to the modem 600.

The signal transmitter 500 includes a second VGA 510 and a second filter 520. The second VGA 510 variably amplifies a signal outputted from the modem 600, and the second filter 520 filters a signal outputted from the second VGA circuit 510 into a signal of a transmission band.

The reception band signal of the signal receiver 400 and the transmission band signal of the signal transmitter 500 are isolated from each other. Because the frequency band of the signal passed by the signal receiver 400 and the frequency band of the signal outputted from the signal transmitter 500 are different from each other, the signal outputted from the bi-directional mixer 300 is not inputted to the signal transmitter 500 and the signal outputted from the signal transmitter 500 is not inputted to the signal receiver 400.

That is, the signal of the transmission band passed by the second filter 520 is greatly attenuated at the reception band, and the signal of the reception band passed by the first filter 410 is greatly attenuated at the transmission band. Therefore, in the embodiment of FIG. 10, the transmission signal and the reception signal are very highly isolated from each other, so that the full-duplex function can be carried out.

The RF filter 105 is optional in the embodiment of the present invention since it may not be provided in an environment with little interference from external signals.

Figure 11A:
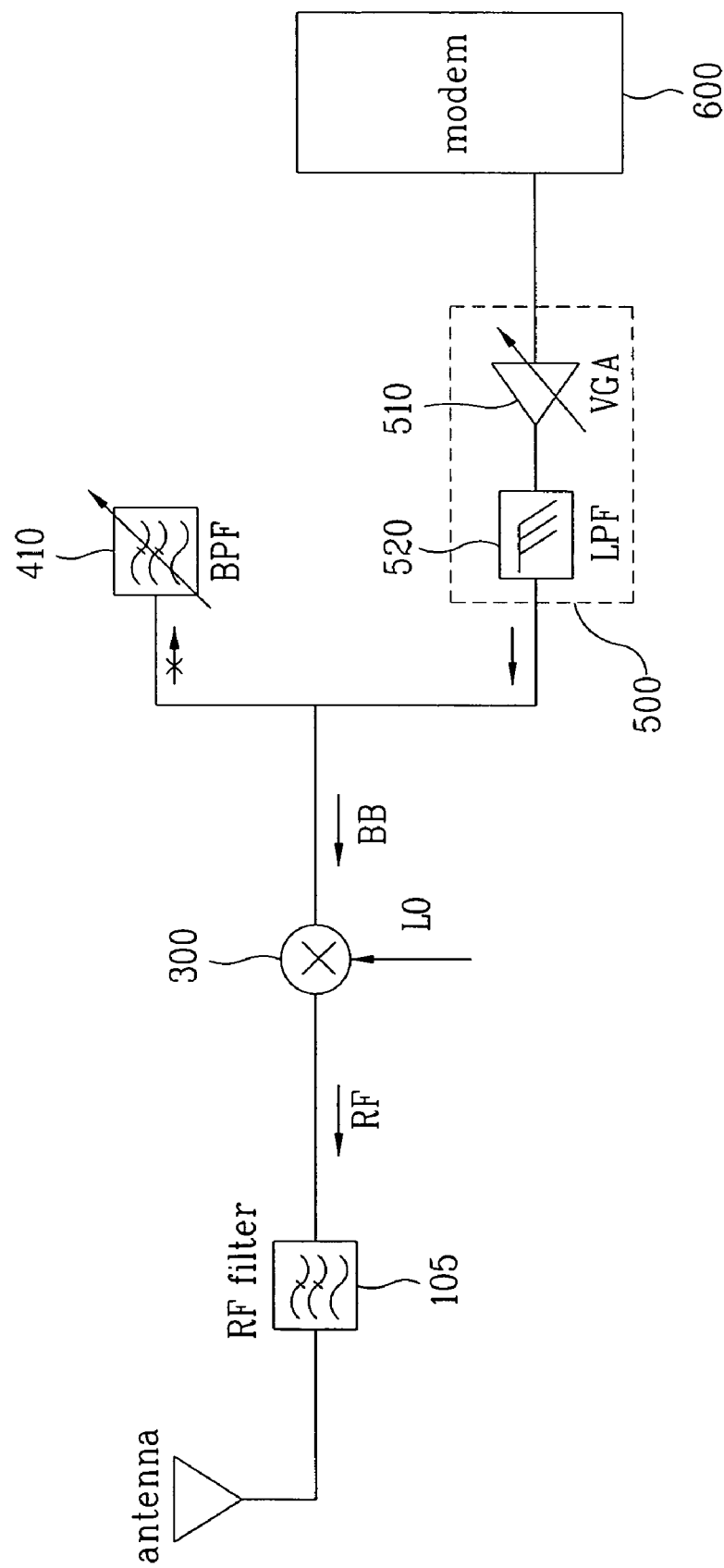
FIG. 11A and FIG. 11B are block diagrams illustrating signal transmission and reception operations of the embodiment of FIG. 10, respectively.

FIG. 11A illustrates an example of the signal transmission operation of the embodiment of FIG. 10 in detail. In order to facilitate a description of the embodiment of FIG. 10, it is assumed that the first filter 410 of the signal receiver is a band pass filter and the second filter 520 of the signal transmitter is a low pass filter. A description will hereinafter be given of the operation principle of the present embodiment on the basis of this assumption. A signal of the IF band passed through the band pass filter and a signal of the baseband passed through the low pass filter are isolated from each other. In FIG. 11A, the signal transmitter 500 receives an signal outputted from the modem 600. The second filter 520 of the signal transmitter 500 passes a signal of the baseband. In contrast, the first filter 410 of the signal receiver 400 passes a signal of the IF band which does not overlap with the baseband. As a result, the first filter 410 does not pass an output signal from the signal transmitter 500.

The bi-directional mixer 300 receives the baseband signal from the signal transmitter 500 and converts the received baseband signal into an RF signal using the oscillation signal. Then, the RF filter 105 filters the RF signal from the bi-directional mixer 300 and outputs the filtered RF signal to an antenna.

Figure 11B:
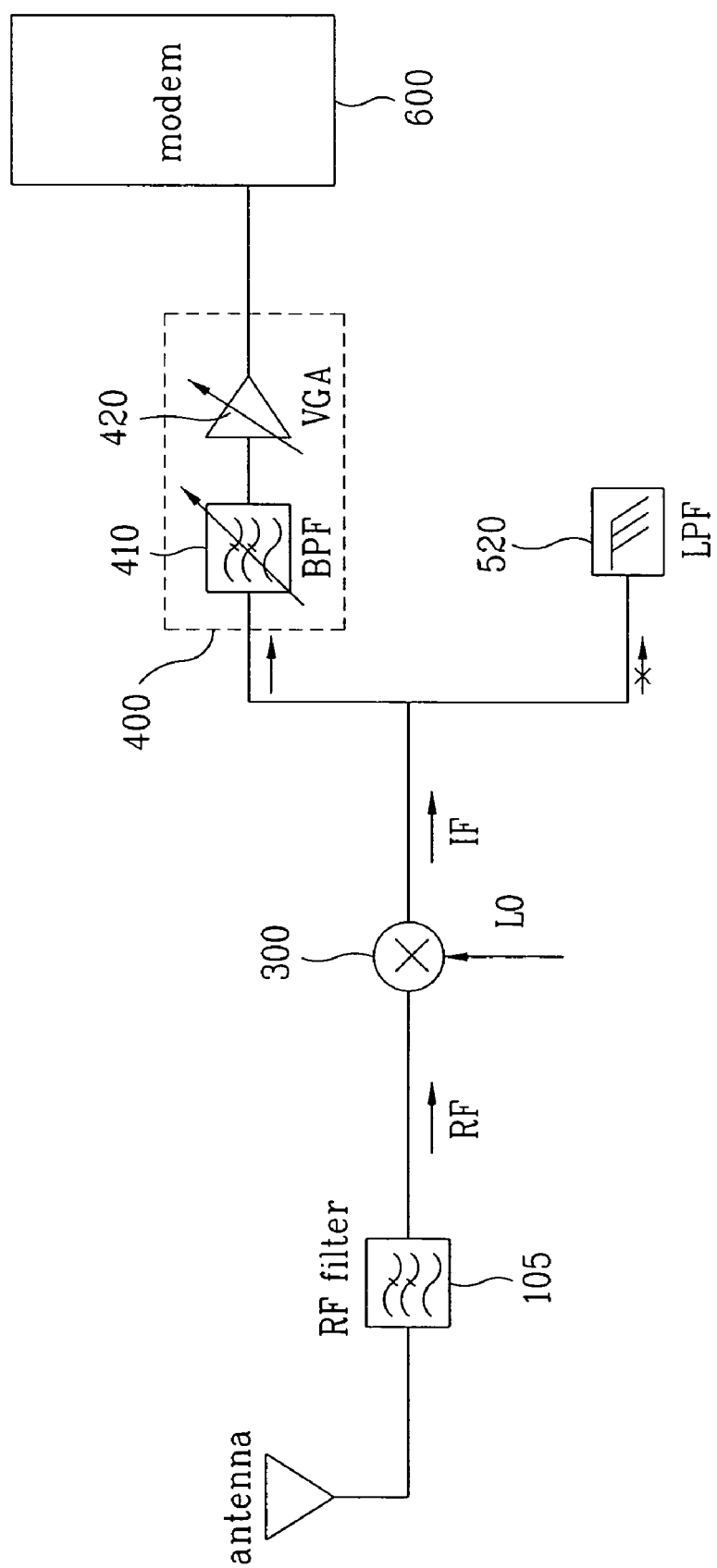

FIG. 11B illustrates an example of the signal reception operation of the embodiment of FIG. 10 in detail. A description will hereinafter be given of the signal reception operation principle of the present embodiment with reference to FIG. 11B.

The RF filter 105 filters an RF signal received through the antenna at a predetermined frequency band and outputs the filtered signal, and the bi-directional mixer 300 receives the signal outputted from the RF filter 105, converts the received signal into a signal of the reception band using the oscillation signal and outputs the converted signal. Assuming that the reception band is not the baseband, the first filter 410 of the signal receiver 400 passes only the signal of the reception band. The signal passed through the first filter 410 is inputted to the modem 600.

In contrast, the second filter 520 of the signal transmitter 500 can pass only a signal of the baseband and cannot pass the signal of the reception band. As a result, the reception signal outputted from the bi-directional mixer cannot be passed through the second filter 520.

Figure 12:
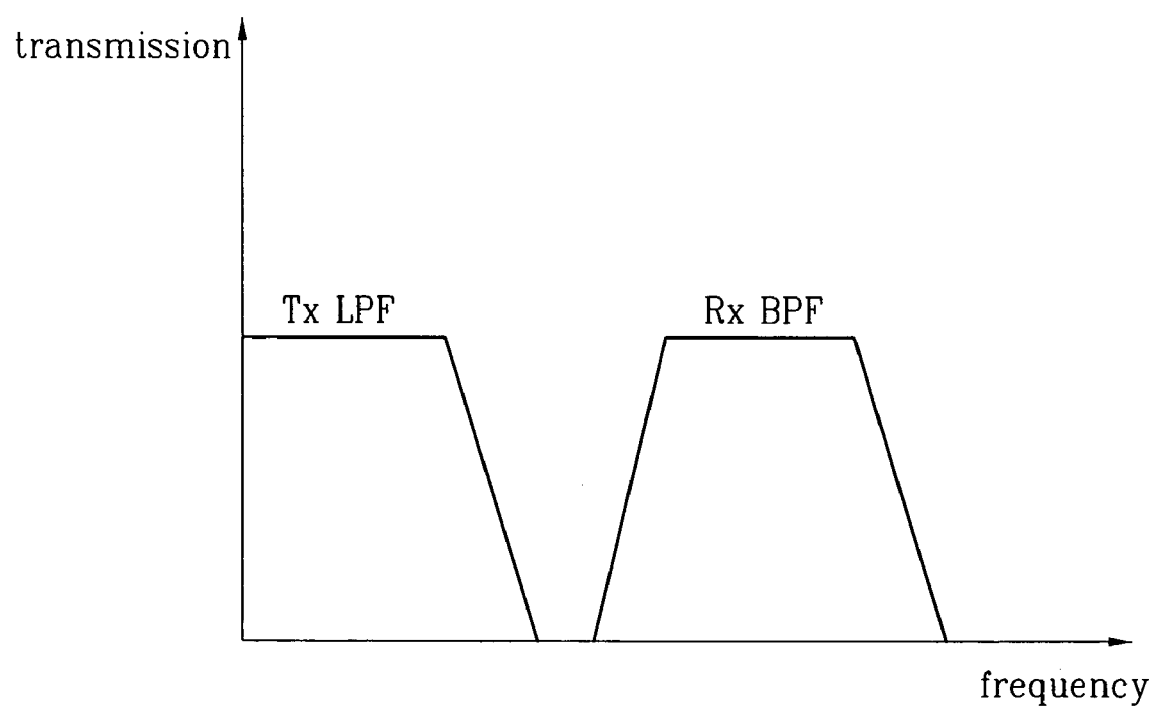
FIG. 12 is a waveform diagram showing frequency bands of signals which are passed by a signal transmitter and signal receiver in FIG. 11A and FIG. 11B.

FIG. 12 is a waveform diagram showing frequency bands of signals which are passed by the signal transmitter and signal receiver in FIG. 11A and FIG. 11B. In the embodiment of FIG. 10, the second filter of the signal transmitter passes a signal of the baseband (Tx LPF), and the first filter of the signal receiver passes a signal of a specific band of the IF band (Rx BPF) isolated from the baseband. Therefore, in the present embodiment, the duplex function can be performed at the baseband and IF band based on the filter characteristics of the signal transmitter and signal receiver, so that no RF duplexer needs to be used.

FIG. 13 is a table illustrating types of filters which can be provided in the signal receiver 400 and signal transmitter 500 of the embodiment of FIG. 10.

In the case where the signal receiver 400 includes a low pass filter (LPF) for passing a signal of the baseband, the signal transmitter 500 includes a band pass filter (BPF) or high pass filter (HPF) for passing a signal of the IF band isolated from the baseband.

In the case where the signal receiver 400 includes a BPF for passing a signal of a first IF band, the signal transmitter 500 includes an LPF for passing only a signal of the baseband isolated from the first IF band. Alternatively, the signal transmitter 500 may include a BPF or HPF for passing only a signal of a second IF band isolated from the first IF band.

In the case where the signal receiver 400 includes an HPF for passing a signal of the first IF band, the signal transmitter 500 includes an LPF for passing only a signal of the baseband isolated from the first IF band, or a BPF for passing only a signal of the second IF band isolated from the first IF band.

Therefore, in any embodiments having the above-stated combinations, a transmission signal in any one of the baseband and the IF band inputted to the bi-directional mixer and a reception signal in any one of the baseband and the IF band outputted from the bi-directional mixer are isolated from each other in terms of frequency bands, thereby enabling the duplex function to be implemented at the IF band.

The operations of various embodiments of the present invention, based on the above-stated combinations, will hereinafter be described in detail.

Figure 14:
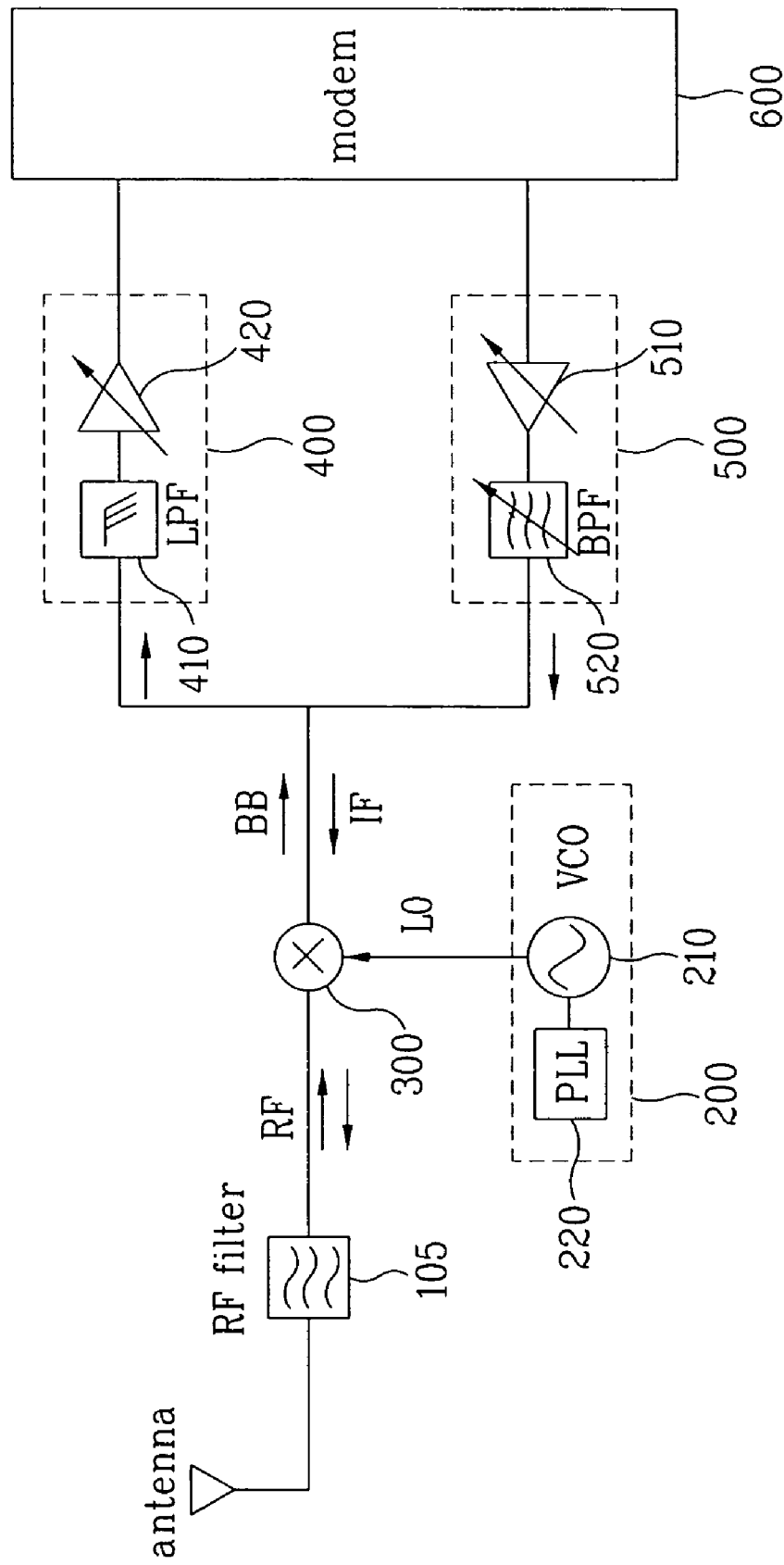
FIG. 14 is a block diagram illustrating a filter characteristics-based operation of another embodiment of the RF signal transmission/reception apparatus according to the present invention.

FIG. 14 is a block diagram showing another embodiment of the RF signal transmission/reception apparatus according to the present invention. The embodiment of FIG. 14 is an example of the embodiment of FIG. 10 where the first filter 410 of the signal receiver 400 is a low pass filter and the second filter 520 of the signal transmitter 500 is a band pass filter. A frequency band isolated from the baseband is passed by the band pass filter.

The signal transmitter 500 filters the signal outputted from the modem 600 through the band pass filter 520 to output a signal of the IF band.

The signal receiver 400 filters the output signal from the bi-directional mixer 300 through the low pass filter 410 to pass only a signal of the baseband.

Because the frequency band of the reception signal between the bi-directional mixer 300 and the signal receiver 400 and the frequency band of the transmission signal between the bi-directional mixer 300 and the signal transmitter 500 are different from each other, the reception signal outputted from the bi-directional mixer 300 is not inputted to the signal transmitter 500 and the transmission signal outputted from the signal transmitter 500 is not inputted to the signal receiver 400.

Further, the embodiment of FIG. 14 is advantageous in that there is no need to remove an image signal, because the signal receiver processes the reception signal at the baseband.

Figure 15:
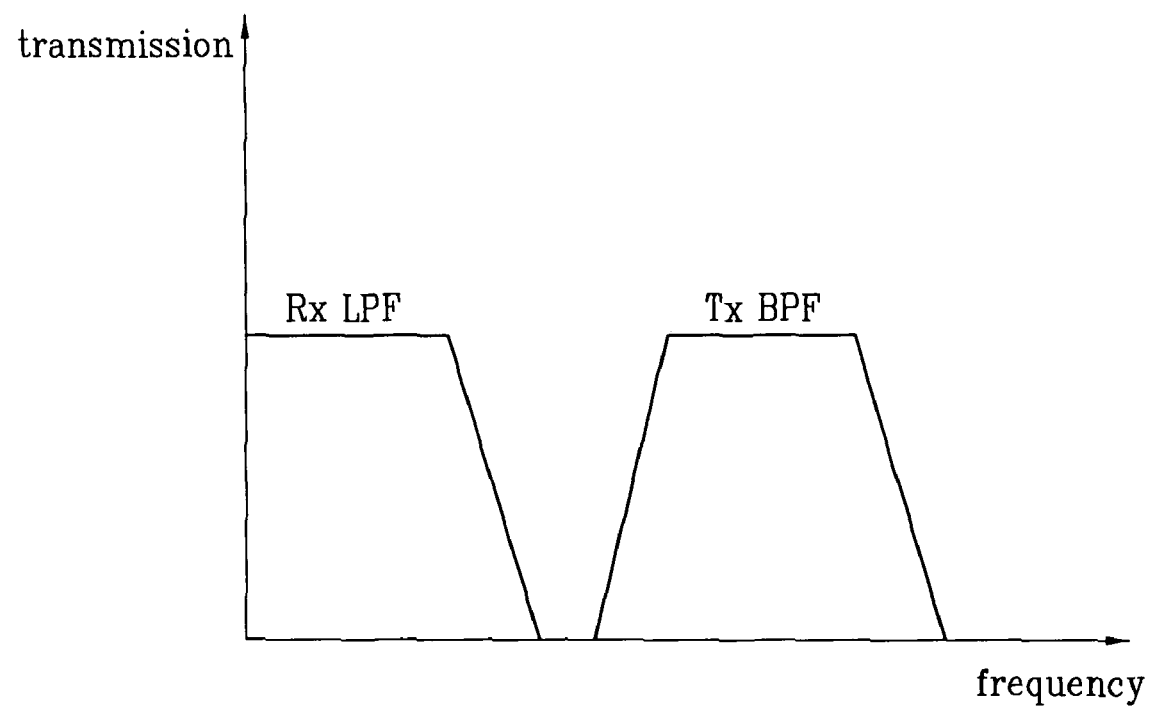
FIG. 15 is a waveform diagram showing frequency bands of signals which are passed by a signal transmitter and signal receiver in FIG. 14.

FIG. 15 is a waveform diagram showing frequency bands of signals which are passed by the signal transmitter and signal receiver in the embodiment of FIG. 14. In the present embodiment, the second filter of the signal transmitter, which is a band pass filter, passes a signal of a specific band (Tx BPF) of the IF band. The first filter of the signal receiver, which is a low pass filter, passes a signal of the baseband (Rx LPF) isolated from the pass band of the signal transmitter. Therefore, in the present embodiment, the duplex function can be implemented at the baseband and/or the IF band.

Figure 16:
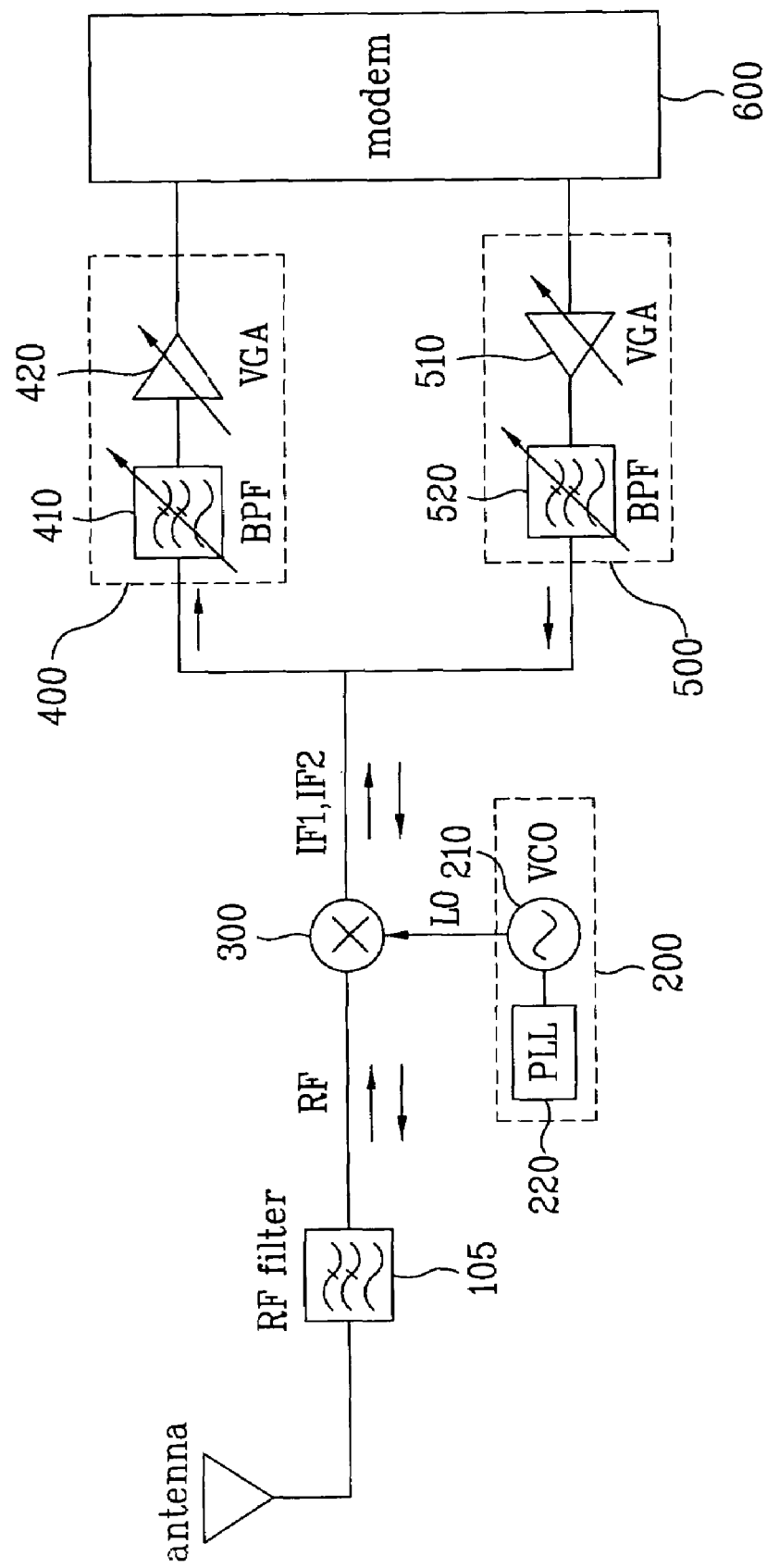
FIG. 16 is a block diagram illustrating a filter characteristics-based operation of another embodiment of the RF signal transmission/reception apparatus according to the present invention.

FIG. 16 is a block diagram showing another embodiment of the RF signal transmission/reception apparatus according to the present invention. In the embodiment of FIG. 16, the first filter 410 of the signal receiver 400 and the second filter 520 of the signal transmitter 500 are band pass filters isolated from each other.

The bi-directional mixer 300 converts a receptino signal of the RF band into a signal of a first IF band and converts a transmission signal of a second IF band into a signal of the RF band.

The first filter 410 of the signal receiver 400 passes only the signal of the first IF band from the output signal from the bi-directional mixer 300.

In contrast, the signal transmitter 500 receives the signal outputted from the modem 600 and outputs the signal of the second IF band.

In the embodiment of FIG. 16, because both the signal transmitter and the signal receiver transmit and receive signals through the IF band, it is possible to avoid a DC offset problem which may occur in converting an RF signal into a zero IF band (baseband) signal.

Further, the embodiment of FIG. 16 is preferable in that it is possible to avoid a 1/f noise which may occur when a CMOS device is used for the frequency band conversion.

Figure 17:
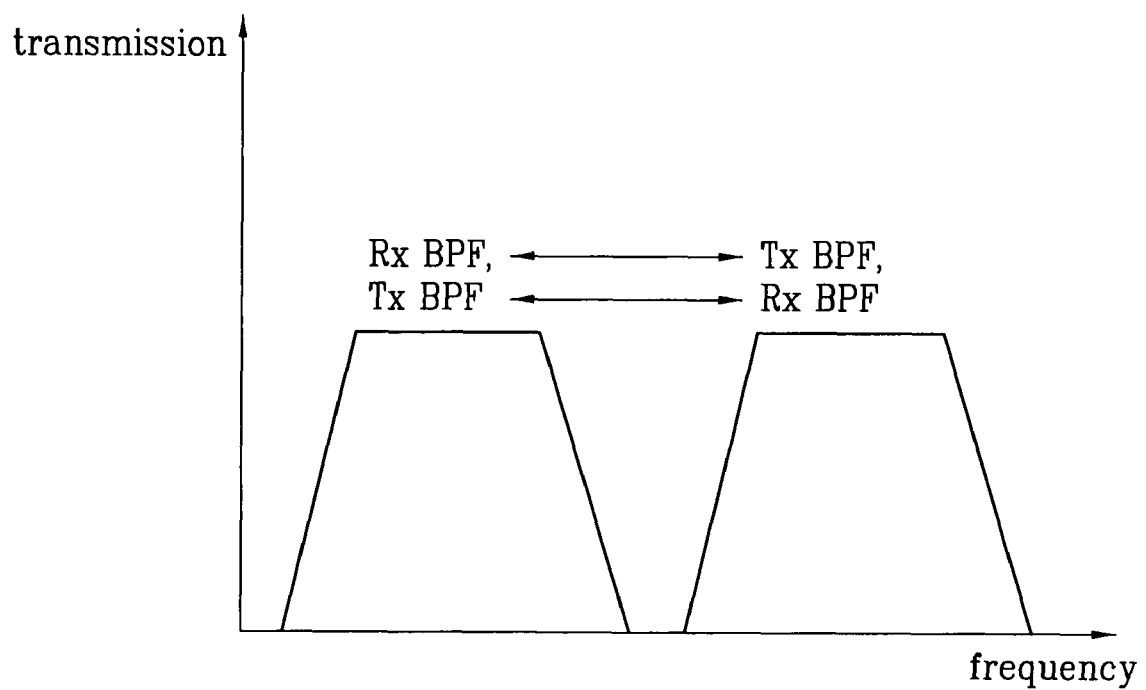
FIG. 17 is a waveform diagram showing frequency bands of signals which are passed by a signal transmitter and signal receiver in FIG. 16.

FIG. 17 is a waveform diagram showing frequency bands of signals which are passed by the signal transmitter and signal receiver in the embodiment of FIG. 16. In the embodiment of FIG. 16, the second filter of the signal transmitter, which is a band pass filter, passes a signal of the second IF band (Tx BPF), and the first filter of the signal receiver, which is a band pass filter, passes a signal of the first IF band (Rx BPF) isolated from the pass band of the signal transmitter.

Therefore, in the embodiment of FIG. 16, the duplex function can be implemented at the IF band.

Figure 18:
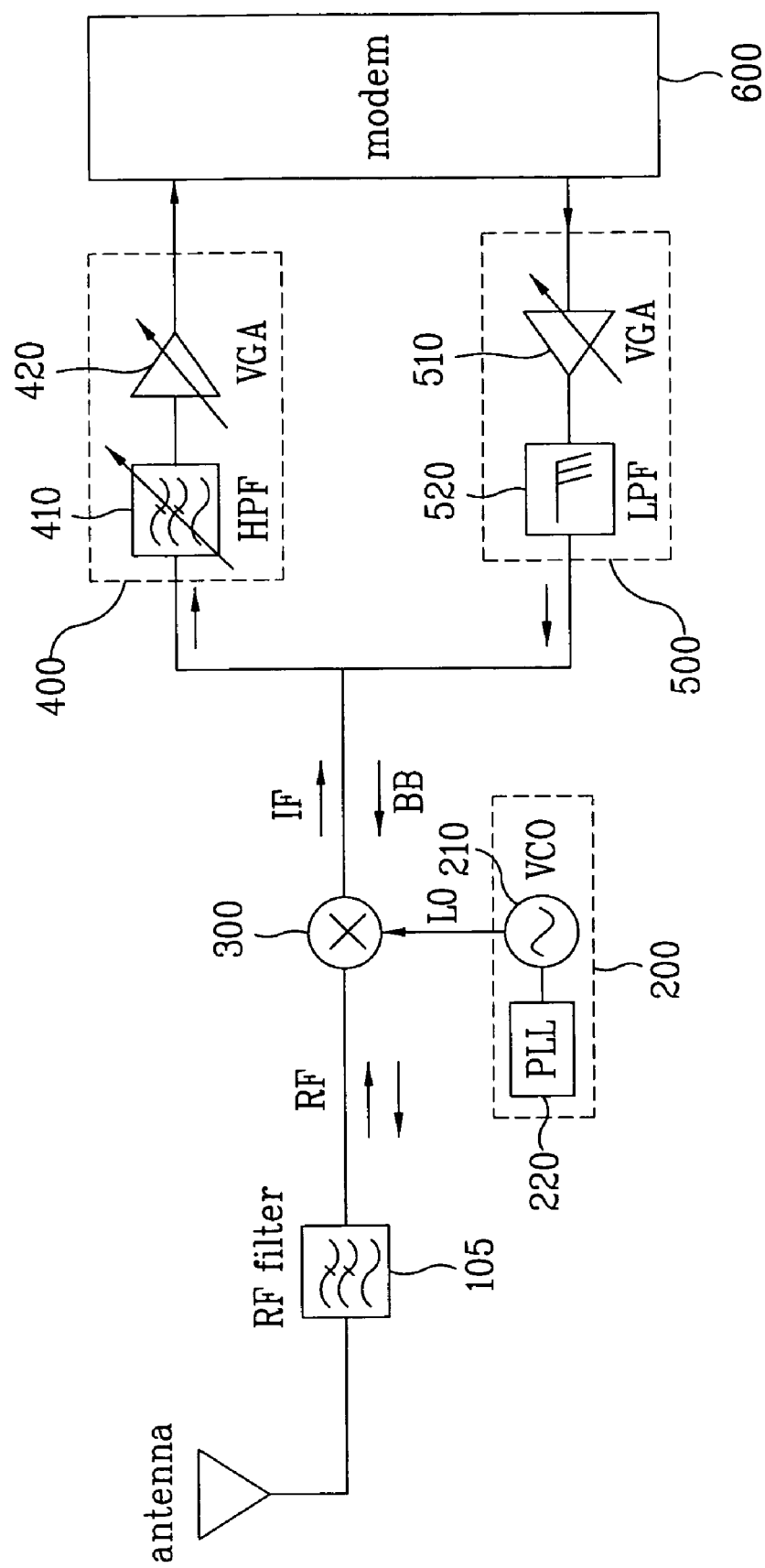
FIG. 18 is a block diagram illustrating a filter characteristics-based operation of another embodiment of the RF signal transmission/reception apparatus according to the present invention.

FIG. 18 is a block diagram showing another embodiment of the RF, signal transmission/reception apparatus according to the present invention. In the embodiment of FIG. 18, the first filter 410 of the signal receiver 400 and the second filter 520 of the signal transmitter 500 are a high pass filter and a low pass filter isolated from each other, respectively.

The signal receiver 400 receives a signal of the IF band outputted from the bi-directional mixer 300 and filters the received signal through the high pass filter.

In contrast, the signal transmitter 500 receives the signal outputted from the modem 600 and filters it to pass only a signal of the baseband isolated from the signal filtered through the high pass filter.

Figure 19:
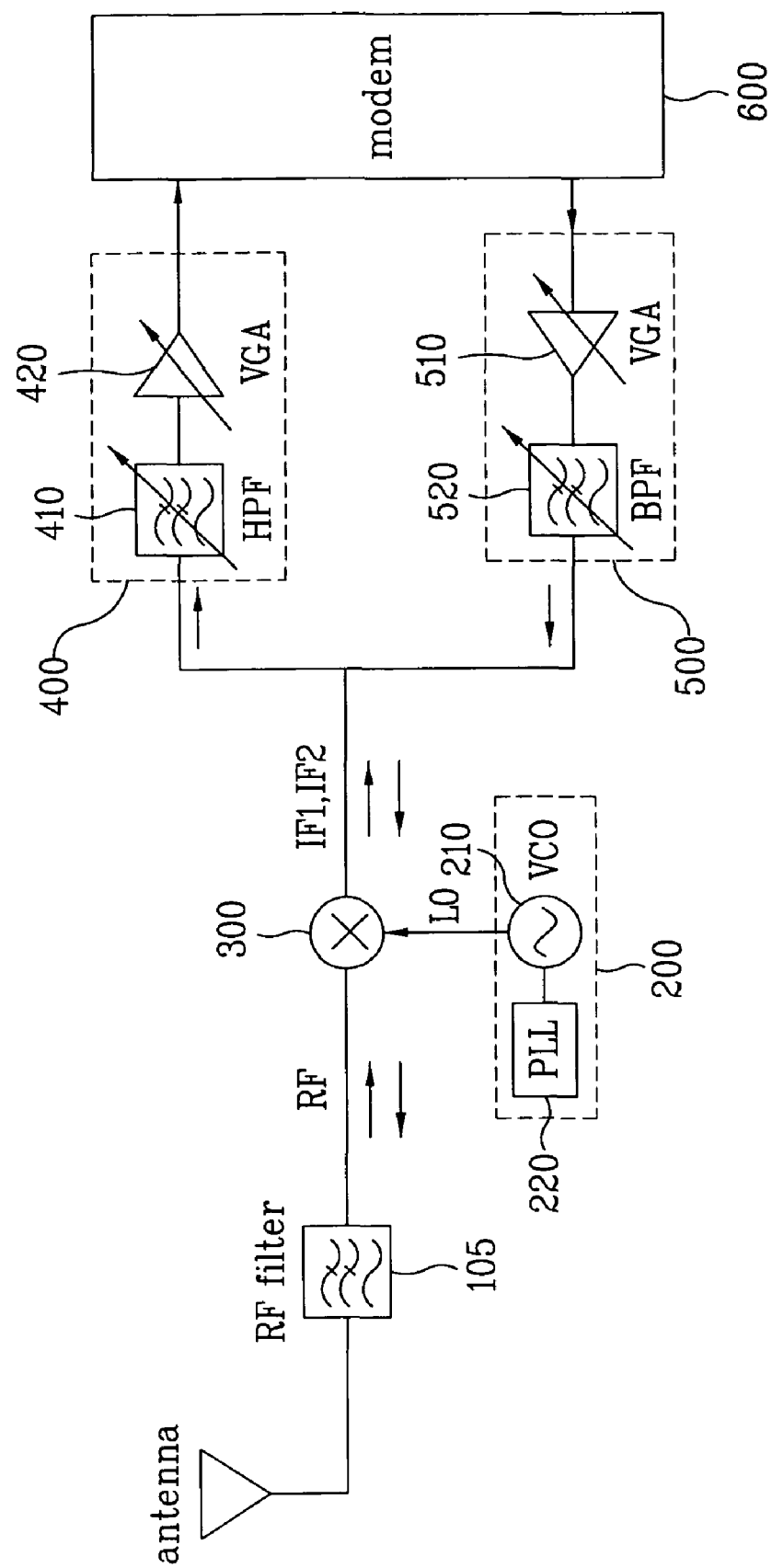
FIG. 19 is a block diagram illustrating a filter characteristics-based operation of another embodiment of the RF signal transmission/reception apparatus according to the present invention.

FIG. 19 is a block diagram showing another embodiment of the RF signal transmission/reception apparatus according to the present invention.

The signal receiver 400 receives a signal of the IF band outputted from the bi-directional mixer 300 and filters the received signal through a high pass filter.

In contrast, the signal transmitter 500 receives the output signal from the modem 600 and filters it to pass only a signal of the IF band isolated from the signal filtered through the high pass filter.

Figure 20:
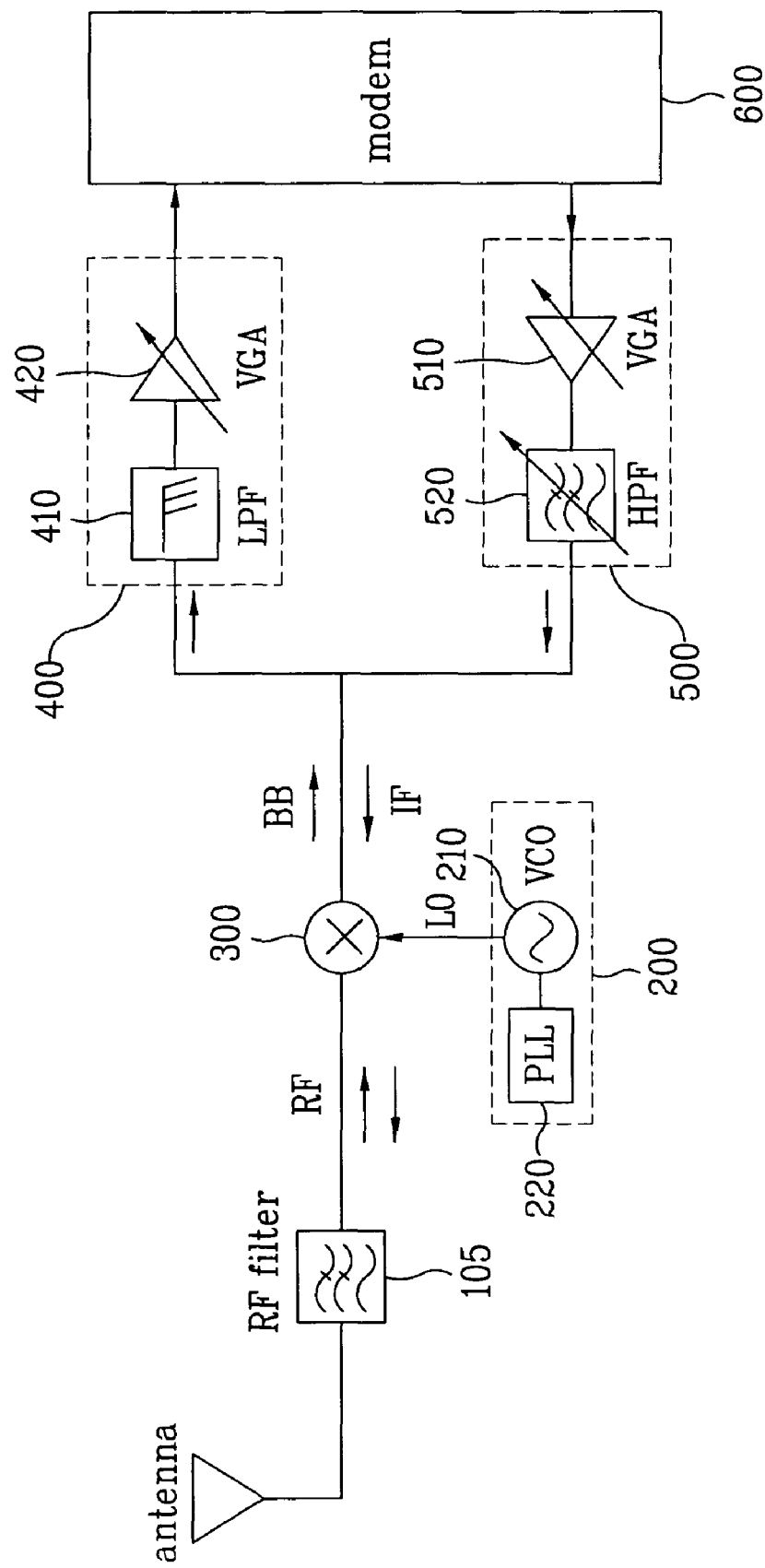
FIG. 20 is a block diagram illustrating a filter characteristics-based operation of another embodiment of the RF signal transmission/reception apparatus according to the present invention.

FIG. 20 is a block diagram showing another embodiment of the RF signal transmission/reception apparatus according to the present invention.

The signal receiver 400 receives a baseband signal outputted from the bi-directional mixer 300 and filters the received signal through a low pass filter.

The signal transmitter 500 receives the output signal from the modem 600 and filters it to pass only a signal of the IF band isolated from the signal filtered through the low pass filter.

Figure 21:
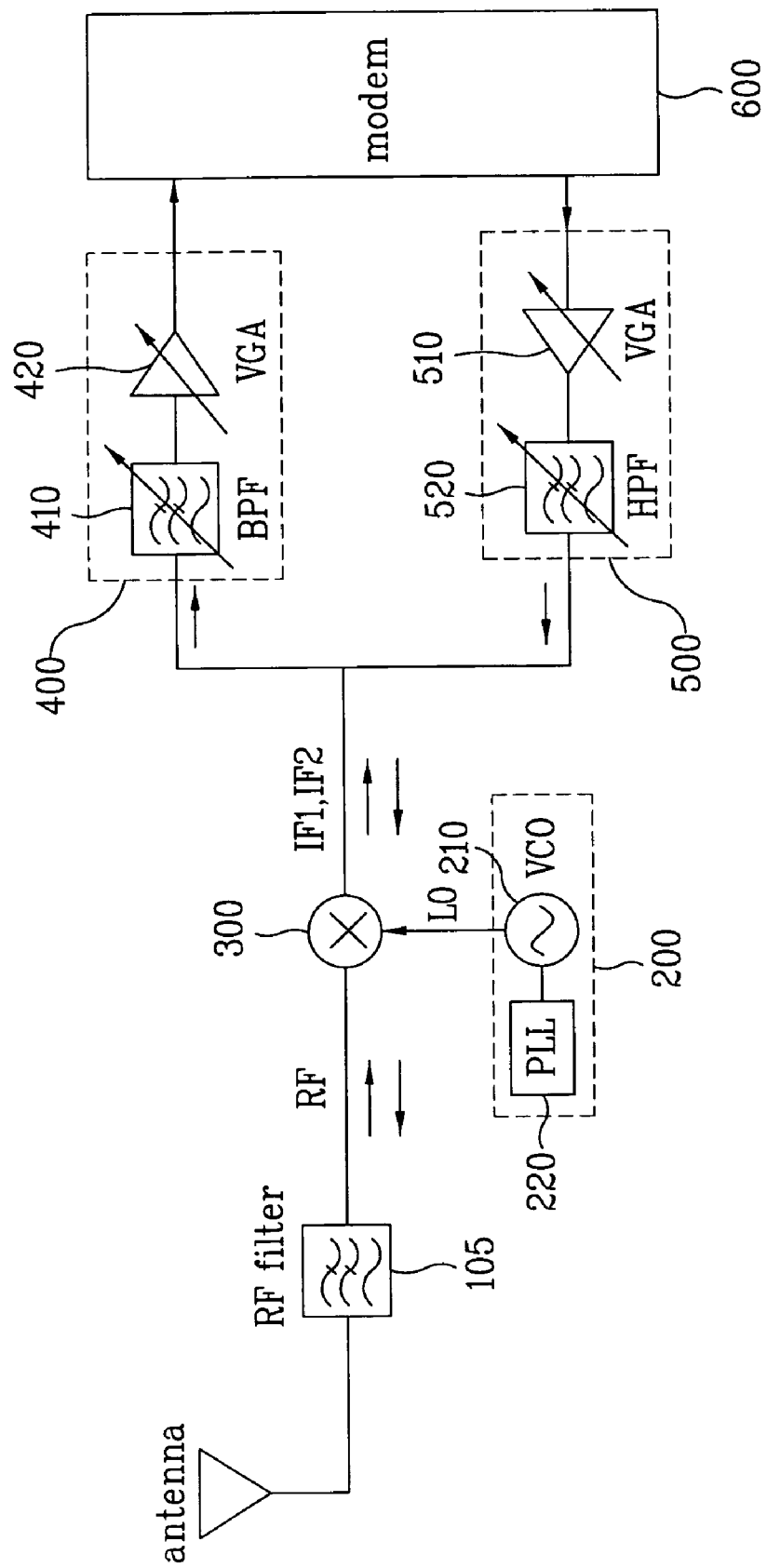
FIG. 21 is a block diagram illustrating a filter characteristics-based operation of another embodiment of the RF signal transmission/reception apparatus according to the present invention.

FIG. 21 is a block diagram showing another embodiment of the RF signal transmission/reception apparatus according to the present invention.

The signal receiver 400 receives a signal of the IF band outputted from the bi-directional mixer 300 and filters the received signal through a band pass filter.

The signal transmitter 500 filters the output signal from the modem 600 to pass only a signal of the IF band isolated from the signal filtered through the band pass filter.

Figure 22:
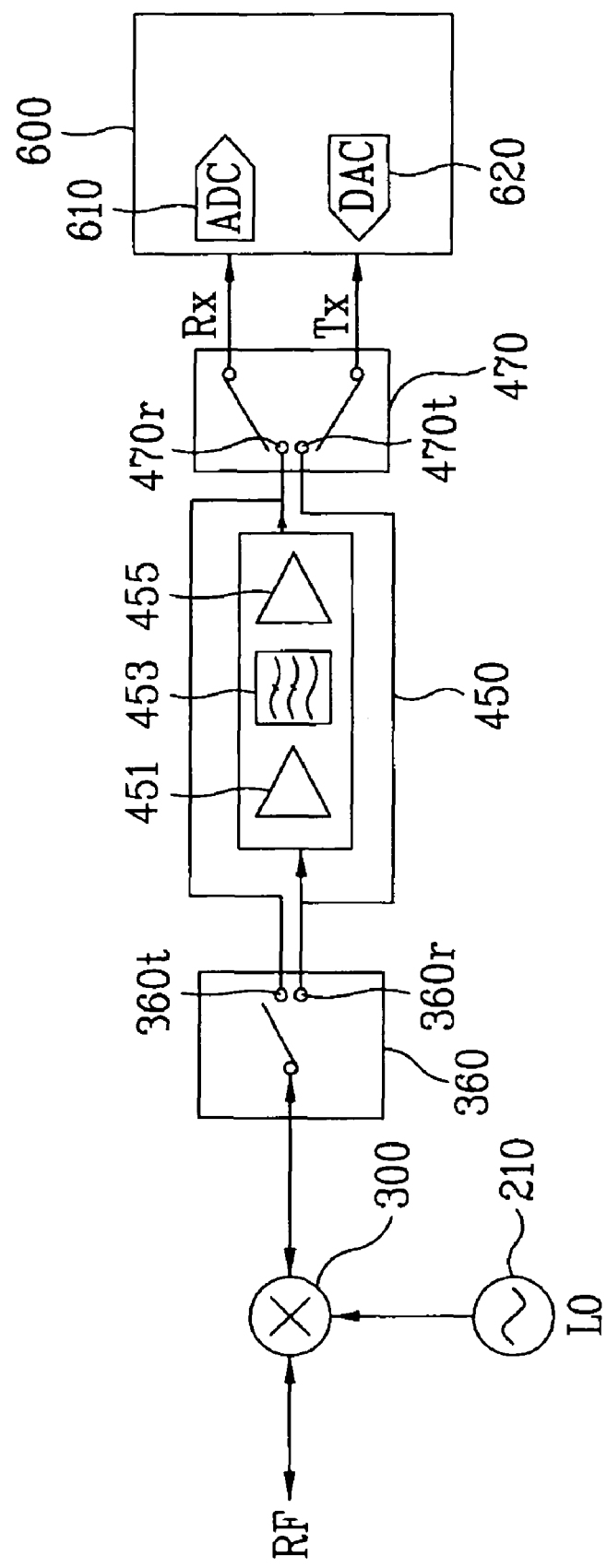
FIG. 22 is a block diagram showing another embodiment of the RF signal transmission/reception apparatus according to the present invention.

FIG. 22 is a block diagram showing another embodiment of the RF signal transmission/reception apparatus according to the present invention.

In the present embodiment, the RF signal transmission/reception apparatus comprises a frequency synthesizer 200, a bi-directional mixer 300, a first signal selector 360, a signal transmitter/receiver unit 450, a second signal selector 470, and a modem 600. The frequency synthesizer 200, the bi-directional mixer 300 and the modem 600 are operated in the same manner as those stated previously.

Exceptionally, in the embodiment of FIG. 22, the signal transmitter/receiver unit 450 is implemented to perform the functions of both the above-stated signal receiver 400 and signal transmitter 500. Accordingly, the signal transmitter/receiver unit 450 acts to process a reception signal belonging to any one of the baseband and the IF band, and a transmission signal belonging to any one of the baseband and the IF band.

In the embodiment of FIG. 22, the first signal selector 360 and the second signal selector 470 are provided to process both the reception signal and transmission signal. Because the signal transmitter/receiver unit 450 processes the reception signal or the transmission signal according to switching of the first signal selector 360 and the second signal selector 470, the embodiment of FIG. 22 can, in theory, provide a half-duplex scheme.

The first signal selector 360 selectively connects the bi-directional mixer 300 to a first transmission terminal 360*t* thereof for signal transmission and to a first reception terminal 360*r* thereof for signal reception. The second signal selector 470 selectively connects the modem 600 to a second reception terminal 470*r* thereof for signal reception and to a second transmission terminal 470*t* thereof for signal transmission. When the bi-directional mixer 300 is connected to the first transmission terminal 360*t* and the modem 600 is connected to the second transmission terminal 470*t*, a transmission signal from the modem 600 is transferred to the bi-directional mixer 300 through the signal transmitter/receiver unit 450. When the bi-directional mixer 300 is connected to the first reception terminal 360*r* and the modem 600 is connected to the second reception terminal 470*r*, a reception signal converted by the bi-directional mixer 300 is transferred to the modem 600 through the signal transmitter/receiver unit 450. Both the transmission signal from the modem 600 and the reception signal converted by the bi-directional mixer 300 belong to the baseband or the IF band.

Therefore, according to the embodiment of FIG. 22, the RF signal transmission/reception apparatus does not need to comprise the signal receiver and the signal transmitter individually, so that it can be simplified in structure and reduced in size. In this embodiment, the signal transmitter/receiver unit 450 includes a first amplifier 451, a filter 453, and a second amplifier 455. The first amplifier 451 may be a low-noise amplifier and the second amplifier 455 may be a variable gain amplifier. The operation of the embodiment of FIG. 22 will be described later in detail with reference to FIG. 24 and FIG. 25.

Figure 23:
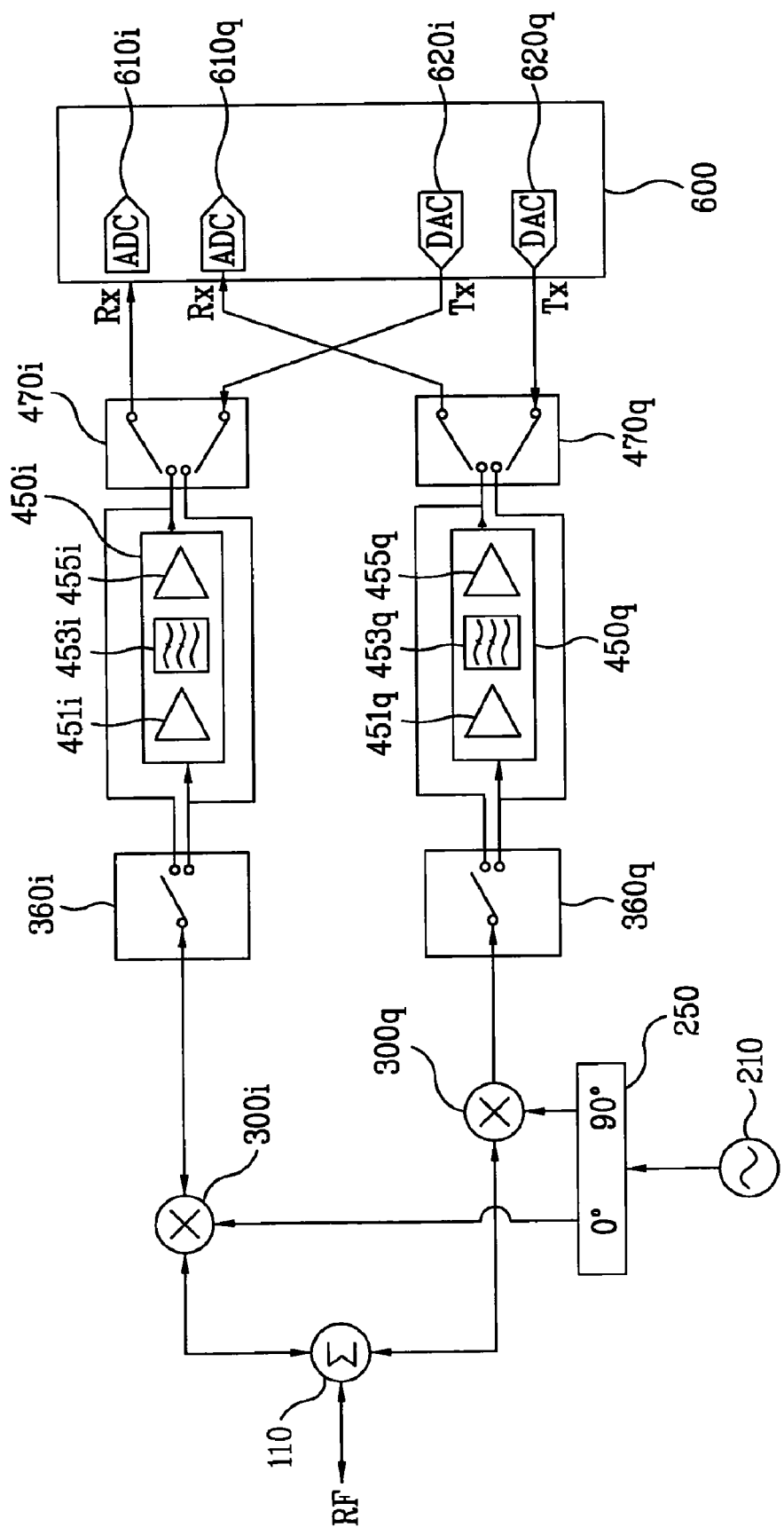
FIG. 23 is a block diagram showing a modified embodiment of the embodiment of FIG. 22, which processes inphase and quadrature signals.

FIG. 23 is a block diagram showing a modified embodiment of the embodiment of FIG. 22, which processes differential signals.

The embodiment of FIG. 23 comprises an inphase signal transmitter/receiver unit 450*i* for processing inphase transmission and reception signals, and a quadrature signal transmitter/receiver unit 450*q* for processing quadrature transmission and reception signals.

A process of processing inphase and quadrature signals in the embodiment of FIG. 23 is similar to a process of processing a single-ended signal. Hence, since those skilled in the art can realize the embodiment of FIG. 23 from an embodiment which processes the single-ended signal, the operation of the embodiment which processes the single-ended signal will hereinafter be described in detail with reference to FIG. 24 and FIG. 25.

Figure 24:
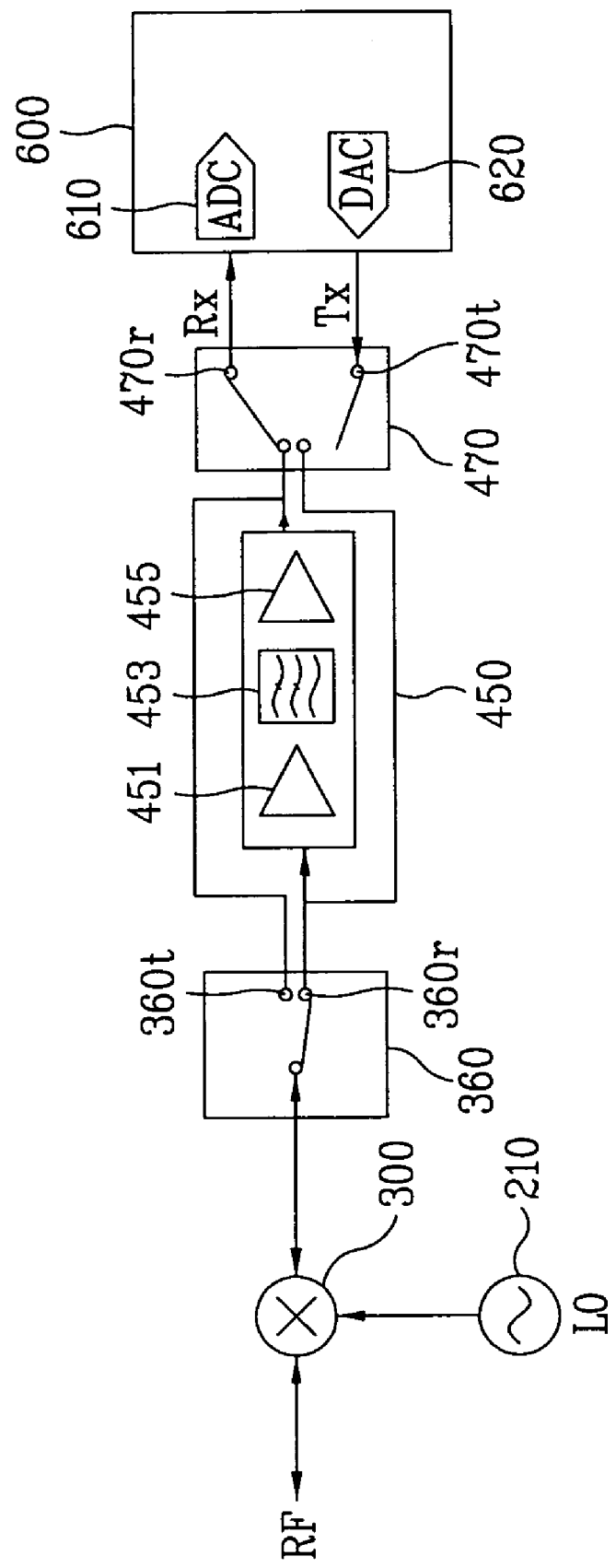
FIG. 24 is a block diagram illustrating a reception signal processing operation of the embodiment of FIG. 22.

FIG. 24 is a block diagram illustrating a signal reception operation of the embodiment of FIG. 22. In order to facilitate a discriminative description of signals outputted from respective elements in FIGS. 22, 23, 26 and 27, those signals are identified by identifiers "first signal", "second signal", "third signal" and "fourth signal".

In the embodiment of the RF signal transmission/reception apparatus according to the present invention shown in FIG. 22, the bi-directional mixer 300 converts a reception signal of the RF band into a first signal belonging to any one of the baseband and the IF band using an oscillation signal from an oscillator 210 of the frequency synthesizer 200.

For signal reception in the embodiment of FIG. 22, the first signal selector 360 selects the first reception terminal 360r and the second signal selector 470 selects the second reception terminal 470r. As a result, the first signal converted by the bi-directional mixer 300 is outputted through the signal transmitter/receiver unit 450 as a third signal, which is then inputted to the modem 600. The first amplifier 451 of the signal transmitter/receiver unit 450 amplifies the first signal. The filter 453 filters the first signal amplified by the first amplifier 451, and the second amplifier 455 re-amplifies the filtered first signal and outputs the re-amplified signal as the third signal. The second reception terminal 470r of the second signal selector 470 transfers the third signal outputted from the signal transmitter/receiver unit 450 to an analog-to-digital converter (ADC) 610 of the modem 600.

Here, the first amplifier 451 may be a low-noise amplifier and the second amplifier 455 may be a variable gain amplifier. The second reception terminal 470r of the second signal selector 470 transfers the third signal from the signal transmitter/receiver unit 450 to the ADC 610 of the modem 600. Both the first signal and third signal belong to the baseband or the IF band.

Figure 25:
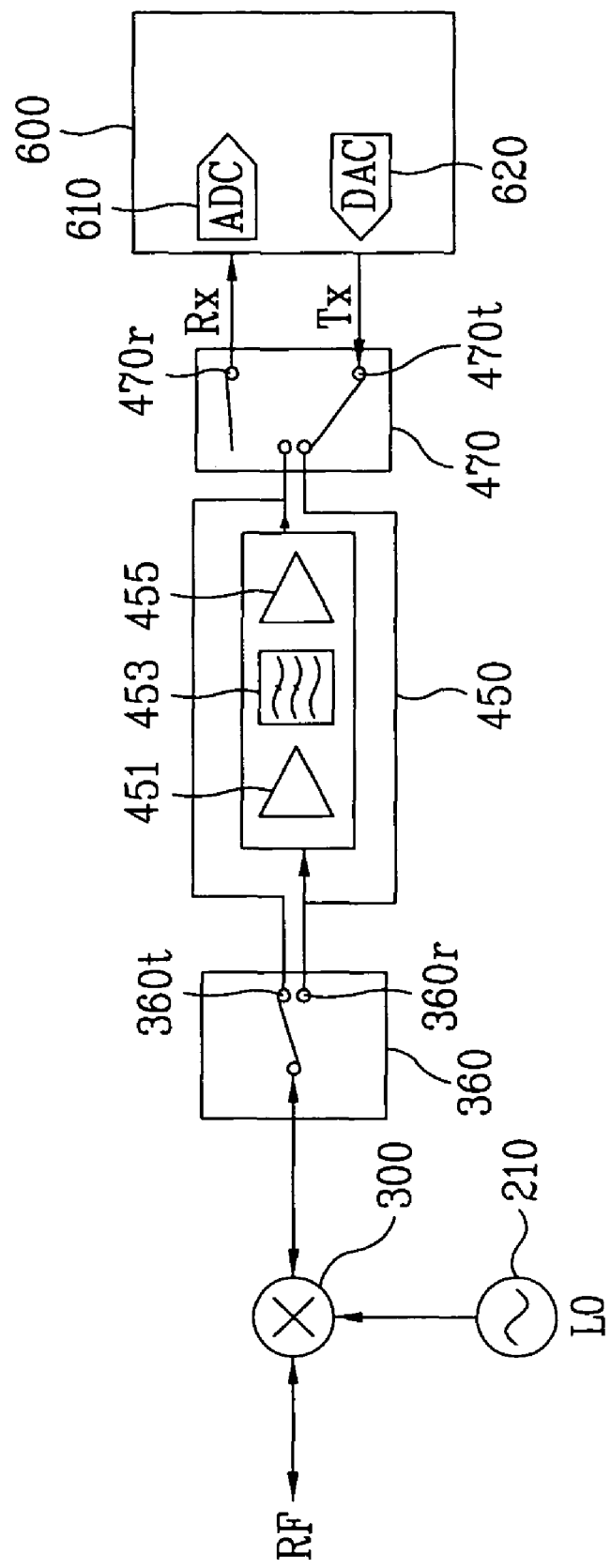
FIG. 25 is a block diagram illustrating a transmission signal processing operation of the embodiment of FIG. 22.

FIG. 25 is a block diagram illustrating a signal transmission operation of the embodiment of FIG. 22.

For signal transmission in the present embodiment, the first signal selector 360 and the second signal selector 470 select the first transmission terminal 360t and the second transmission terminal 470t, respectively.

When a digital-to-analog converter (DAC) 620 of the modem 600 outputs a second signal which is a transmission signal belonging to any one of the baseband and the IF band, the second signal is inputted to the signal transmitter/receiver unit 450 through the second transmission terminal 470t of the second signal selector 470. The first amplifier 451, filter 453 and second amplifier 455 of the signal transmitter/receiver unit 450 perform a low-noise amplification, filtering and variable-gain amplification with respect to the second signal, respectively. Then, the signal transmitter/receiver unit 450 outputs the fourth signal to the bi-directional mixer 300 through the first signal selector 360. At this time, the first signal selector 360 selects the first transmission terminal 360t to transfer the fourth signal, which is the transmission signal belonging to the baseband or the IF band, to the bi-directional mixer 300.

Therefore, according to the embodiment shown in FIGS. 20, 22 and 23, the RF signal transmission/reception apparatus can process and output both the reception signal and transmission signal by means of the signal transmitter/receiver unit 450 and the switching operations, with no need to comprise the signal receiver and the signal transmitter individually. Both the second signal and fourth signal belong to any one of the IF band and the baseband.

Figure 26:
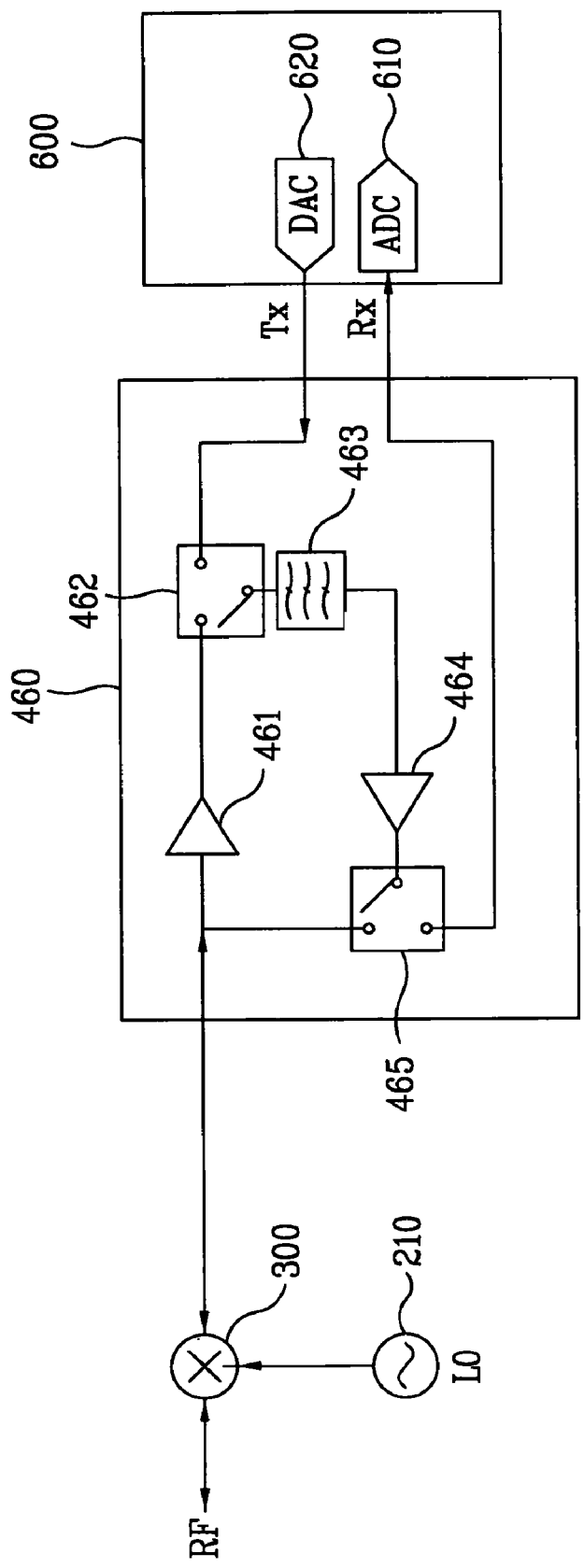
FIG. 26 is a block diagram showing another embodiment of the RF signal transmission/reception apparatus according to the present invention.

FIG. 26 is a block diagram showing another embodiment of the RF signal transmission/reception apparatus according to the present invention. The embodiment of FIG. 26 does not need to comprise the signal transmitter and the signal receiver individually, like the embodiment shown in FIGS. 20 to 23.

In the embodiment of FIG. 26, the RF signal transmission/reception apparatus comprises a frequency synthesizer 200, a bi-directional mixer 300, a signal transmitter/receiver unit 460, and a modem 600. The signal transmitter/receiver unit 460 includes a first amplifier 461, a first signal selector 462, a filter 463, a second amplifier 464, and a second signal selector 465. The signal transmitter/receiver unit 460 processes a reception signal and a transmission signal in different ways through signal selections of the first signal selector 462 and second signal selector 465. The first amplifier 461 may be a low-noise amplifier and the second amplifier 464 may be a variable gain amplifier. The operation of the embodiment of FIG. 26 will be described later in detail with reference to FIG. 28 and FIG. 29.

Figure 27:
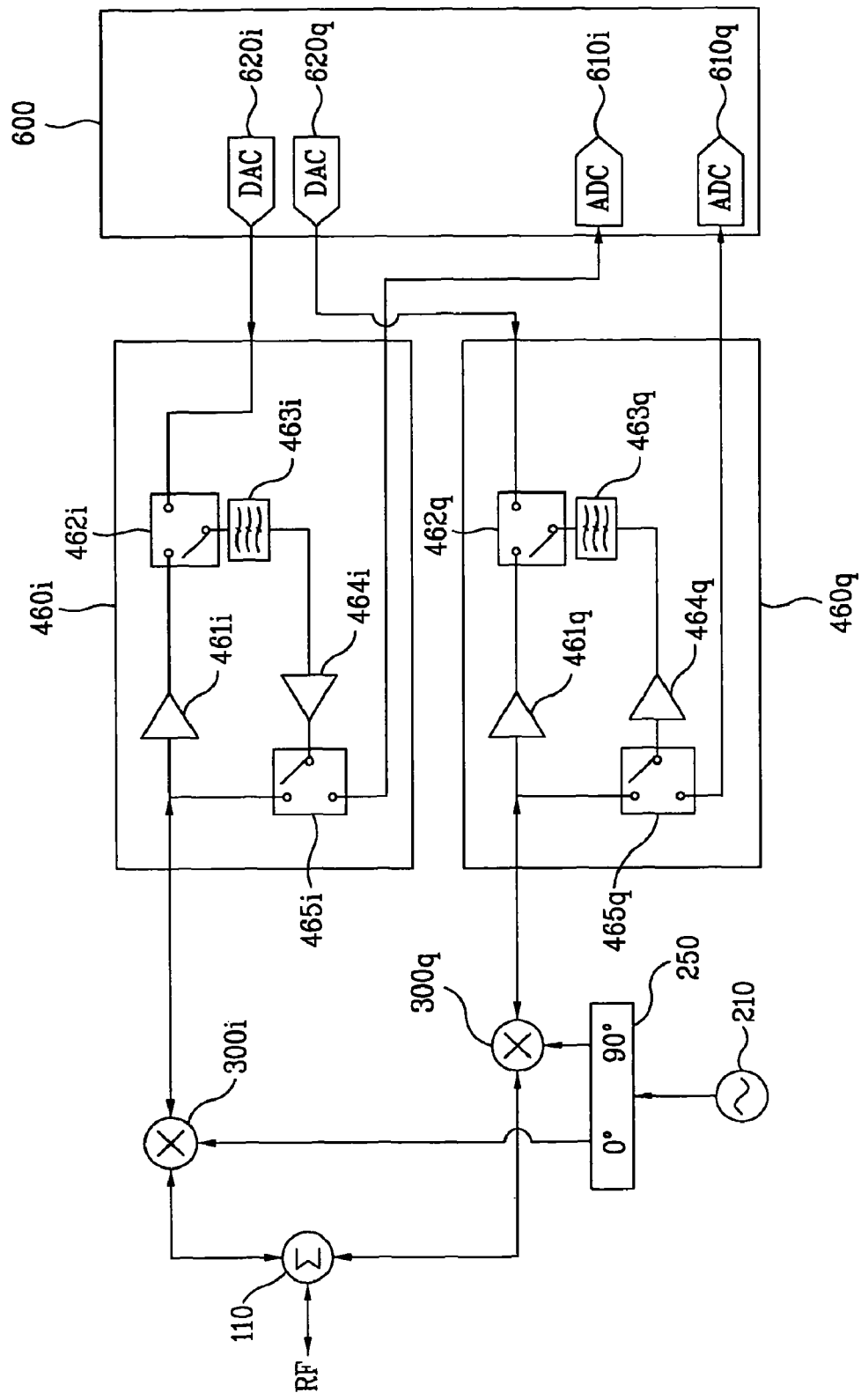
FIG. 27 is a block diagram showing a modified embodiment of the embodiment of FIG. 26, which processes inphase and quadrature signals.

FIG. 27 is a block diagram showing a modified embodiment of the embodiment of FIG. 26, in which the signal transmitter/receiver unit in FIG. 26 processes differential signals. The embodiment of FIG. 27 comprises a first signal transmitter/receiver unit 460i for processing inphase transmission and reception signals, and a second signal transmitter/receiver unit 460q for processing quadrature transmission and reception signals.

Those skilled in the art can also easily understand and realize the embodiment of FIG. 27 from the embodiment of FIG. 26 which processes the single-ended signal. Hence, the operation of the embodiment of FIG. 26 will hereinafter be described in detail with reference to FIG. 28 and FIG. 29.

Figure 28:
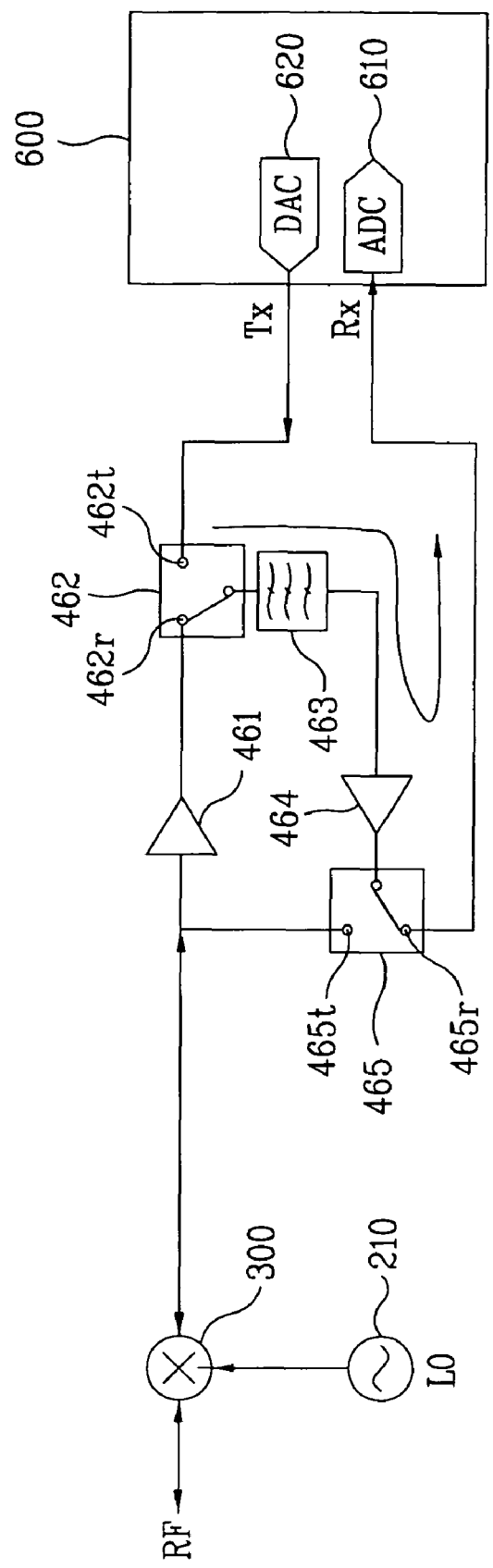
FIG. 28 is a block diagram illustrating a reception signal processing operation of the embodiment of FIG. 26.

FIG. 28 is a block diagram illustrating a signal reception operation of the embodiment of FIG. 26.

In the embodiment of FIG. 26, the RF signal transmission/reception apparatus comprises the frequency synthesizer 200, the bi-directional mixer 300, a signal transmitter/receiver unit 460, and a modem 600, as stated above. The frequency synthesizer 200, the bi-directional mixer 300, the modem 600 and the ADC 610 and DAC 620 of the modem 600 are operated in the same manner as those stated previously.

The signal transmitter/receiver unit 460 includes a first amplifier 461, a first signal selector 462, a filter 463, a second amplifier 464, and a second signal selector 465. For signal reception in the embodiment of FIG. 26, the first signal selector 462 of the signal transmitter/receiver unit 460 selects a reception terminal 462r and the second signal selector 465 thereof selects a reception terminal 465r.

When the bi-directional mixer 300 converts a reception signal of the RF band into a first signal belonging to any one of the baseband and IF band and outputs the converted first signal, the first amplifier 461 amplifies the first signal to reduce a noise factor of the reception signal. The signal amplified by the first amplifier 461 is inputted to the filter 463 through the first signal selector 462. The inputted signal is filtered by the filter 463, variable-gain amplified by the second amplifier 464 and then outputted as a third signal. Then, the third signal is inputted to the ADC 610 of the modem 600 through the second signal selector 465. Both the first signal and third signal belong to the IF band or the baseband.

Figure 29:
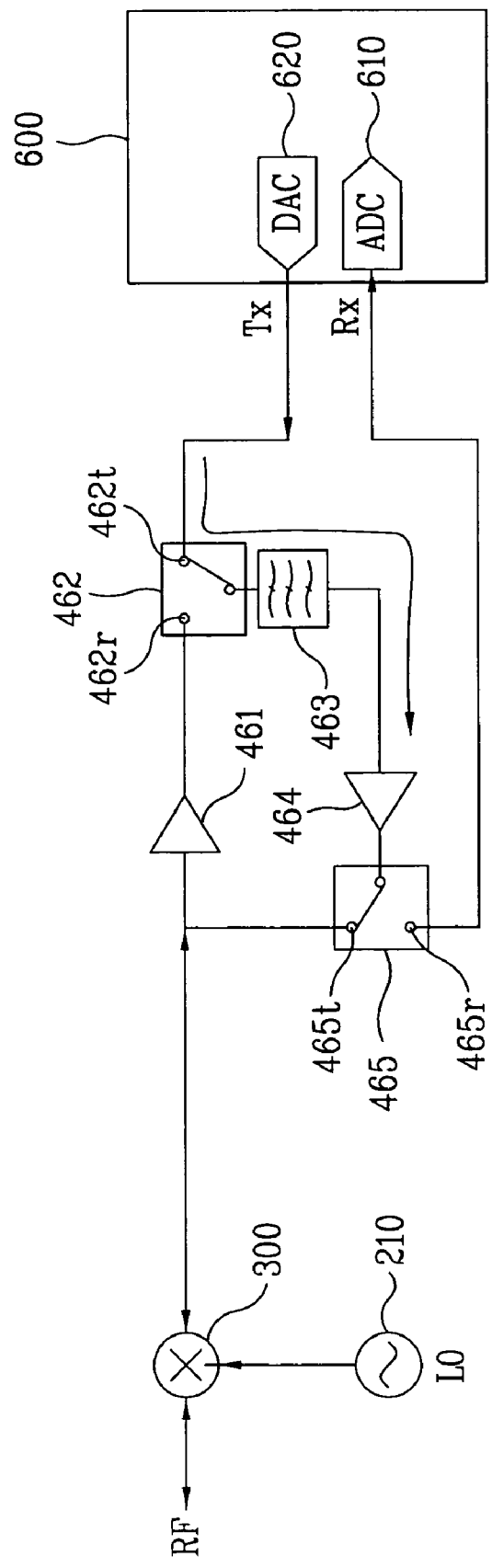
FIG. 29 is a block diagram illustrating a transmission signal processing operation of the embodiment of FIG. 26.

FIG. 29 is a block diagram illustrating a signal transmission operation of the embodiment of FIG. 26. For signal transmission in the present embodiment, the first signal selector 462 of the signal transmitter/receiver unit 460 selects a transmission terminal 462t and the second signal selector 465 thereof selects a transmission terminal 465t. A second signal outputted from the DAC 620 of the modem 600 is inputted to the filter 463 through the transmission terminal 462t of the first signal selector 462. The inputted signal is filtered by the filter 463, variable-gain amplified by the second amplifier 464 and then outputted as a fourth signal. Both the second signal and fourth signal belong to the IF band or the baseband.

The transmission signal of FIG. 29 is not passed through the first amplifier 461, differently from the reception signal of FIG. 28. The signal transmitter/receiver unit 460 can process both the reception signal and transmission signal as shown in FIGS. 26 and 27. At this time, the signal transmitter/receiver unit 460 can process the reception signal and the transmission signal in different ways through proper signal selections.

Figure 30:
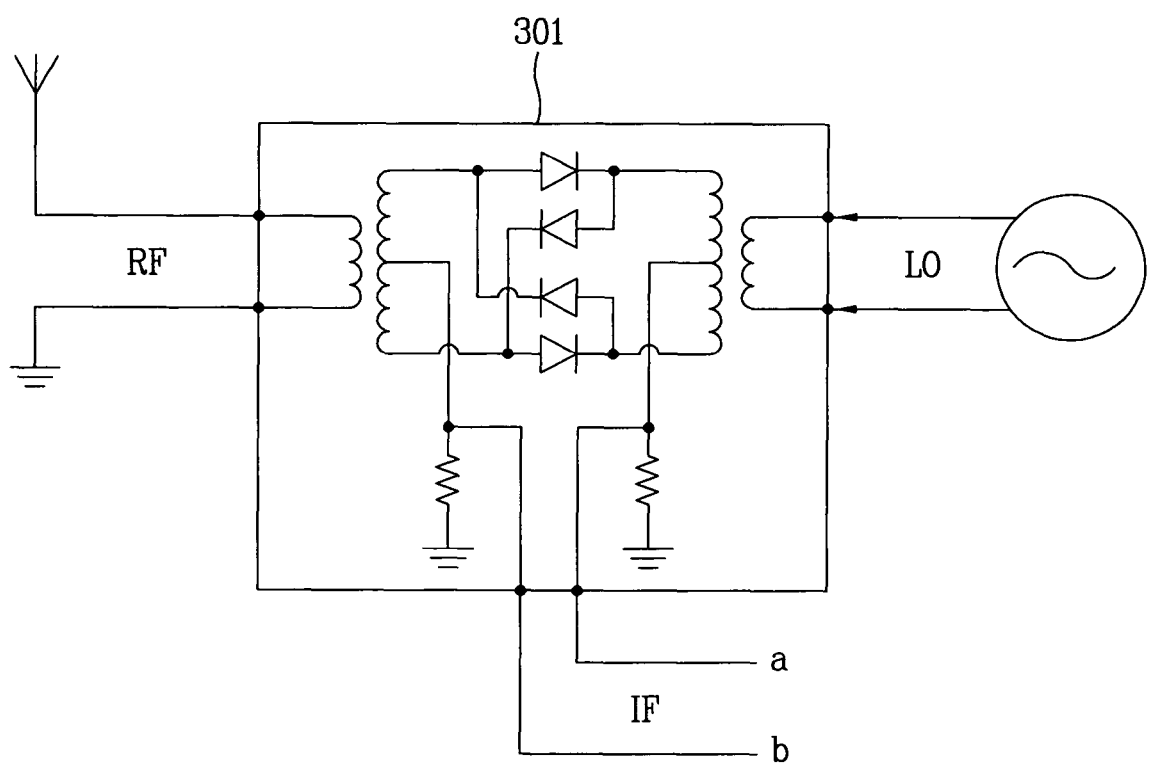
FIG. 30 is a circuit diagram showing a preferred embodiment of a bi-directional mixer in the RF signal transmission/reception apparatus according to the present invention.

FIG. 30 is a circuit diagram showing a preferred embodiment of a bi-directional mixer in the RF signal transmission/reception apparatus according to the present invention.

In this embodiment, the bi-directional mixer is a double balanced mixer including diodes.

A diode on path is changed based on a large signal LO from an oscillator, so that a reception RF signal and the oscillation signal are mixed to generate an IF band signal. Also, the oscillation signal and an IF signal are mixed to generate an RF signal. Two IF band (or baseband) signal output terminals a and b, are connected to virtual ground points of an oscillation signal terminal and a RF signal terminal, respectively, in order to isolate the oscillation signal from the IF band (or baseband) signal, and the RF band signal from the IF band (or baseband) signal. The oscillation signal and the RF signal are isolated from each other by the turned-on diode path and an oscillation signal output terminal and an RF signal output terminal are also connected to each other's virtual ground points, thereby making it possible to isolate the oscillation signal from the RF signal.

Figure 31:
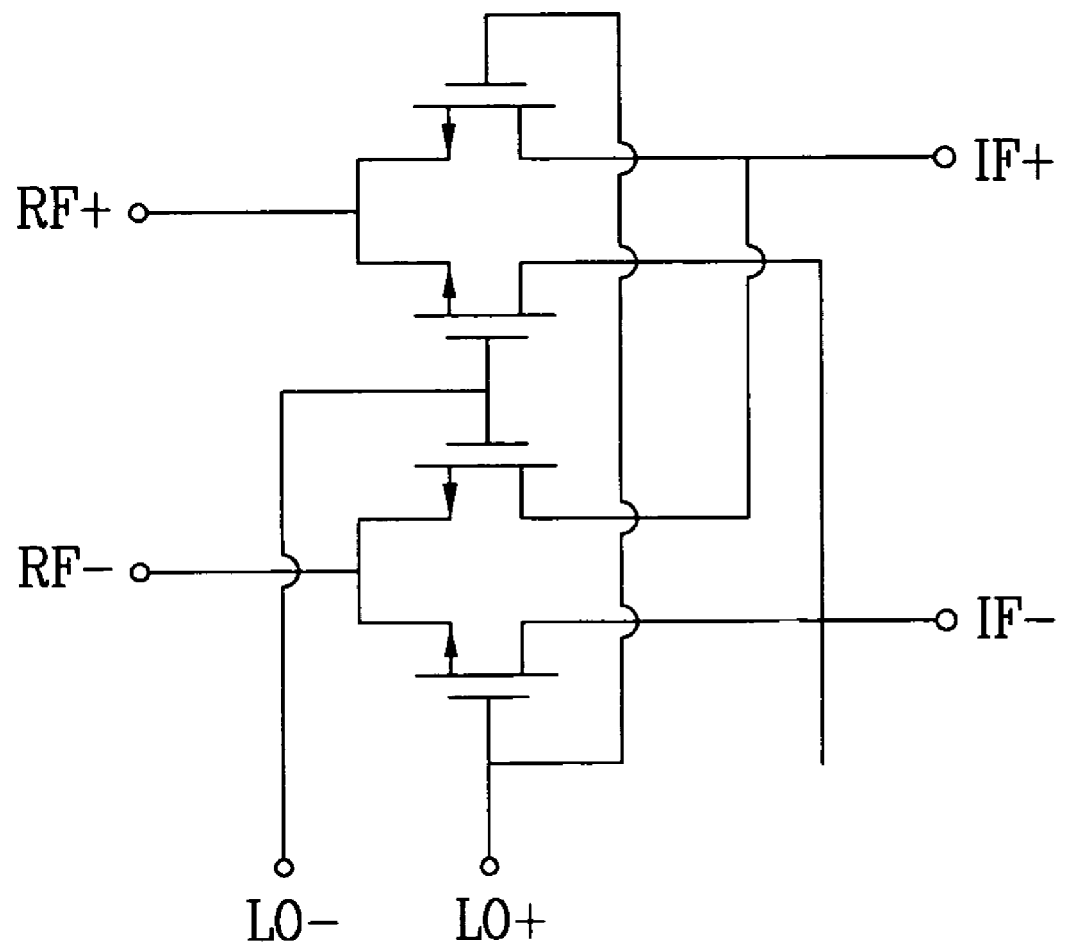
FIG. 31 is a circuit diagram showing an alternative embodiment of the bi-directional mixer in the RF signal transmission/reception apparatus according to the present invention.

FIG. 31 is a circuit diagram showing an alternative embodiment of the bi-directional mixer in the RF signal transmission/reception apparatus according to the present invention. In this embodiment, the bi-directional mixer is a double balanced mixer including transistors.

In the embodiment of the bi-directional mixer of FIG. 31, three signal ports are provided with respect to an RF band signal, an IF band signal and an oscillation signal (LO), respectively, to process balanced signals, each being divided into a positive component and a negative component. Therefore, it is possible to isolate signals through the respective ports each other.

Figure 32:
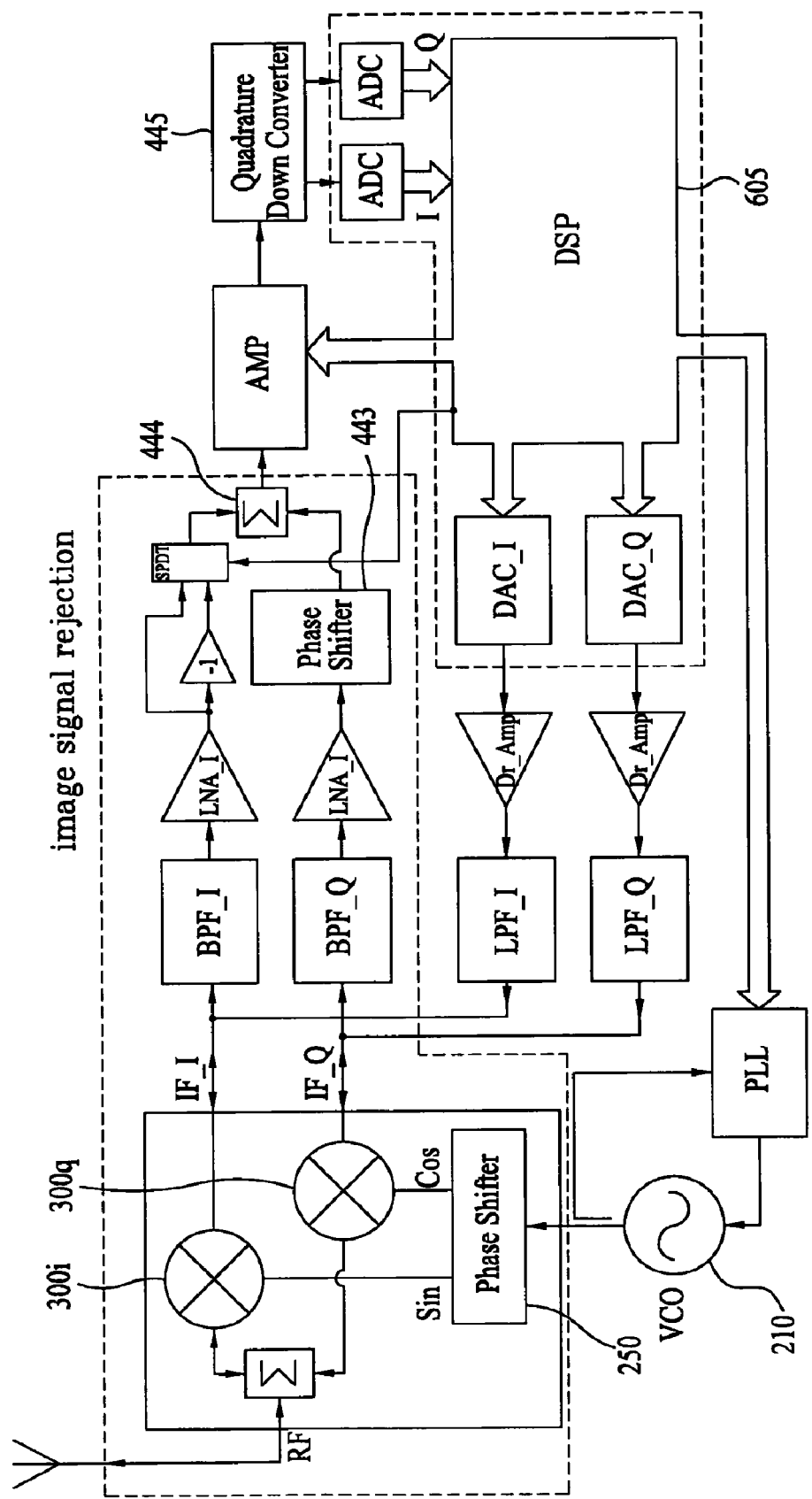
FIG. 32 is a block diagram showing another embodiment of the RF signal transmission/reception apparatus according to the present invention, which has an image signal rejection function.

FIG. 32 is a block diagram showing another embodiment of the RF signal transmission/reception apparatus according to the present invention, which is capable of performing an image signal rejection function when a reception signal is an IF band signal and implementing a full-duplex function. With reference to FIG. 32, a description will hereinafter be given of an operation of this embodiment of the RF signal transmission/reception apparatus according to the present invention for removing an image signal which may occur in signal reception.

In the present embodiment, when a signal receiver receives a signal at the IF band, the received signal may contain an image signal.

In order to remove the image signal, an oscillation signal from an oscillator 210 of a frequency synthesizer 200 is separated into an inphase signal (I signal) and a quadrature signal (Q signal) by a first phase shifter 250.

The first bi-directional mixers 300i for 1 signal and the second bi-directional mixers 300q for Q signal mix the oscillation signals separated by the first phase shifter 250 with a received RF signal, respectively, to output I and Q signals orthogonal to each other. The quadrature signal (Q signal) is inputted through a filter BPF_Q to a second phase shifter 443, which then shifts the phase thereof. A summation unit 444 removes the image signal by summing the quadrature signal. A quadrature down converter 445 generates an I signal and a Q signal from an image signal-removed IF band signal and outputs the generated I signal and Q signal to ADCs. The signals inputted to the ADCs are sampled and then inputted to a digital signal processing unit (DSP) 605. In FIG. 32, a signal transmitter (Dr_AMP and LPF) also processes an I signal and Q signal of the baseband.

Figure 33:
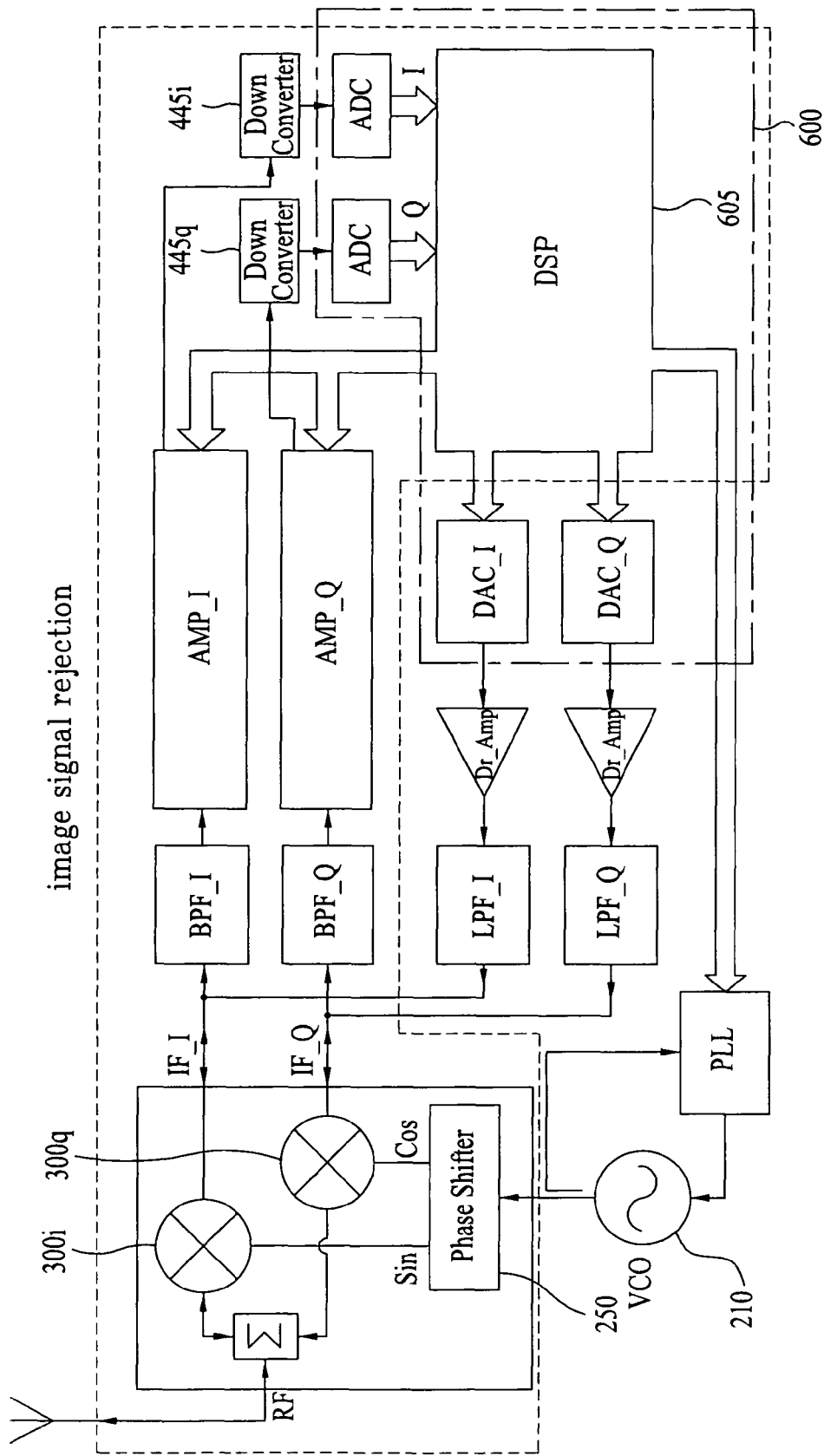
FIG. 33 is a block diagram showing another embodiment of the RF signal transmission/reception apparatus according to the present invention, which has the image signal rejection function.

FIG. 33 is a block diagram showing another embodiment of the RF signal transmission/reception apparatus according to the present invention, which has the image signal rejection function. With reference to FIG. 33, a description will hereinafter be given of an operation of this embodiment of the RF signal transmission/reception apparatus according to the present invention for removing an image signal which may occur in signal reception.

In the embodiment of FIG. 33, an oscillation signal from a frequency synthesizer 200 is separated into an inphase signal (I signal) and a quadrature signal (Q signal) by a first phase shifter 250.

Down converters 445i and 445q convert the frequency bands of an IF band I signal and an IF band Q signal separated by a signal receiver (BPF and AMP), respectively. The frequency-converted I signal and Q signal are converted into digital signals through ADCs and then inputted to a DSP 605. In the embodiment of FIG. 33, the image signal is removed by a summation unit 110 and the DSP 605.

Figure 34:
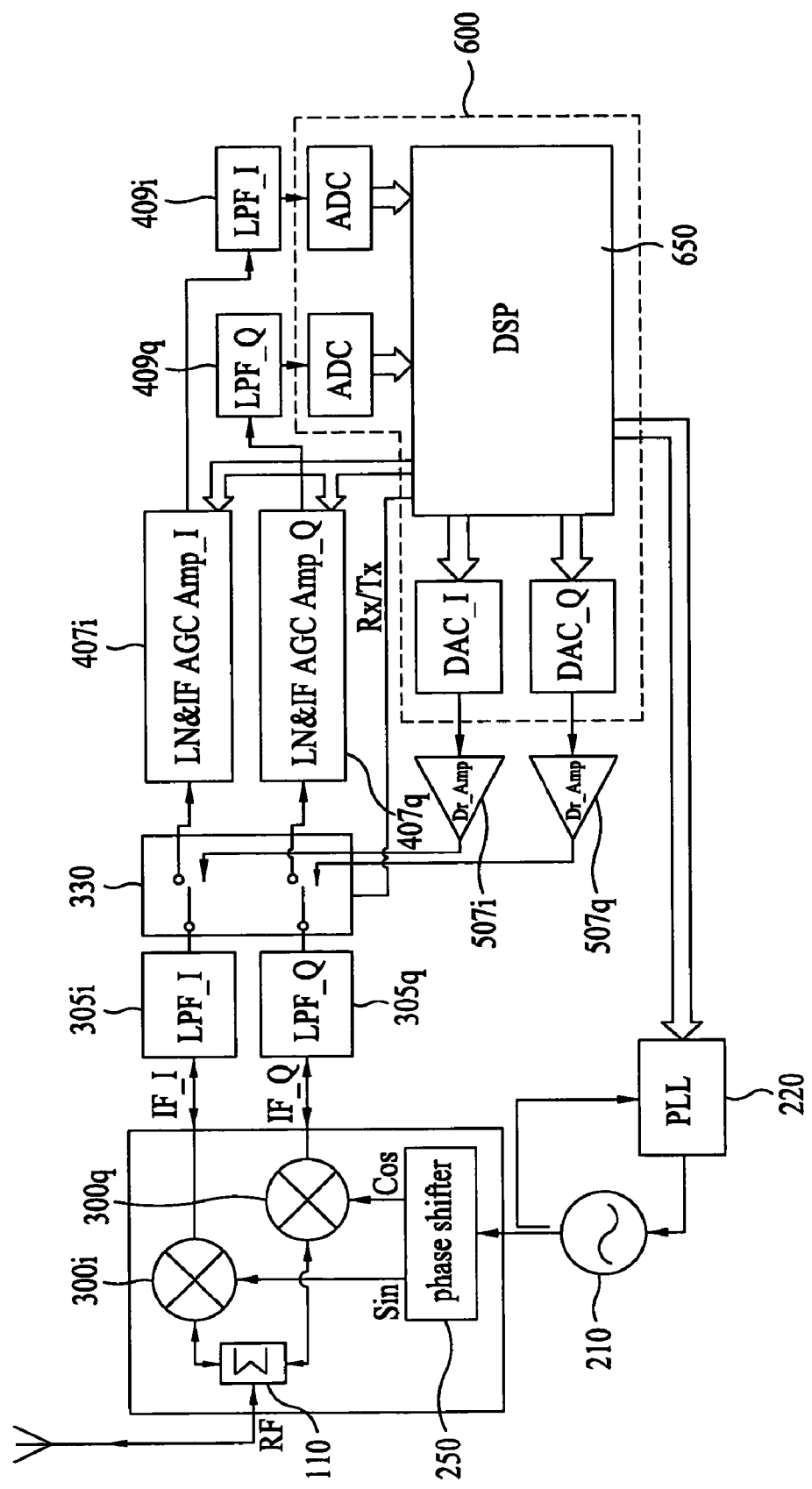
FIG. 34 is a block diagram showing yet another embodiment of the RF signal transmission/reception apparatus according to the present invention, which has the image signal rejection function.

FIG. 34 is a block diagram showing yet another embodiment of the RF signal transmission/reception apparatus according to the present invention, which has the image signal rejection function. The embodiment of FIG. 34 is similar to the embodiment of FIG. 33, with the exception of transmitting and receiving RF signals in a half-duplex manner.

In the embodiment of FIG. 34, an oscillation signal from a frequency synthesizer 200 is separated into an inphase signal (I signal) and a quadrature signal (Q signal) by a phase shifter 250.

A first bi-directional mixer 300i bi-directionally converts an inphase signal of the RF band and an inphase signal of the baseband. A second bi-directional mixer 300q is operated in the same manner as the first bi-directional mixer 300i, with the exception of converting quadrature signals.

The embodiment of FIG. 34 can implement a half-duplex function by comprising a switching circuit 330 which selects a transmission terminal or reception terminal in response to a control signal from a DSP 650 of a modem 600. For signal reception, an inphase signal and a quadrature signal are inputted to ADCs of the modem 600 through amplifiers 407i and 407q and filters 409i and 409q, respectively. For signal transmission, an inphase signal and a quadrature signal from DACs of the modem 600 are outputted through amplifiers 507i and 507q and switching of the switching circuit 330. A summation unit 110 combines the outputted inphase signal and quadrature signal and outputs the combined transmission RF signal to an antenna. In the embodiment of FIG. 34, the image signal is removed by the summation unit 110 and DSP.

Figure 35:
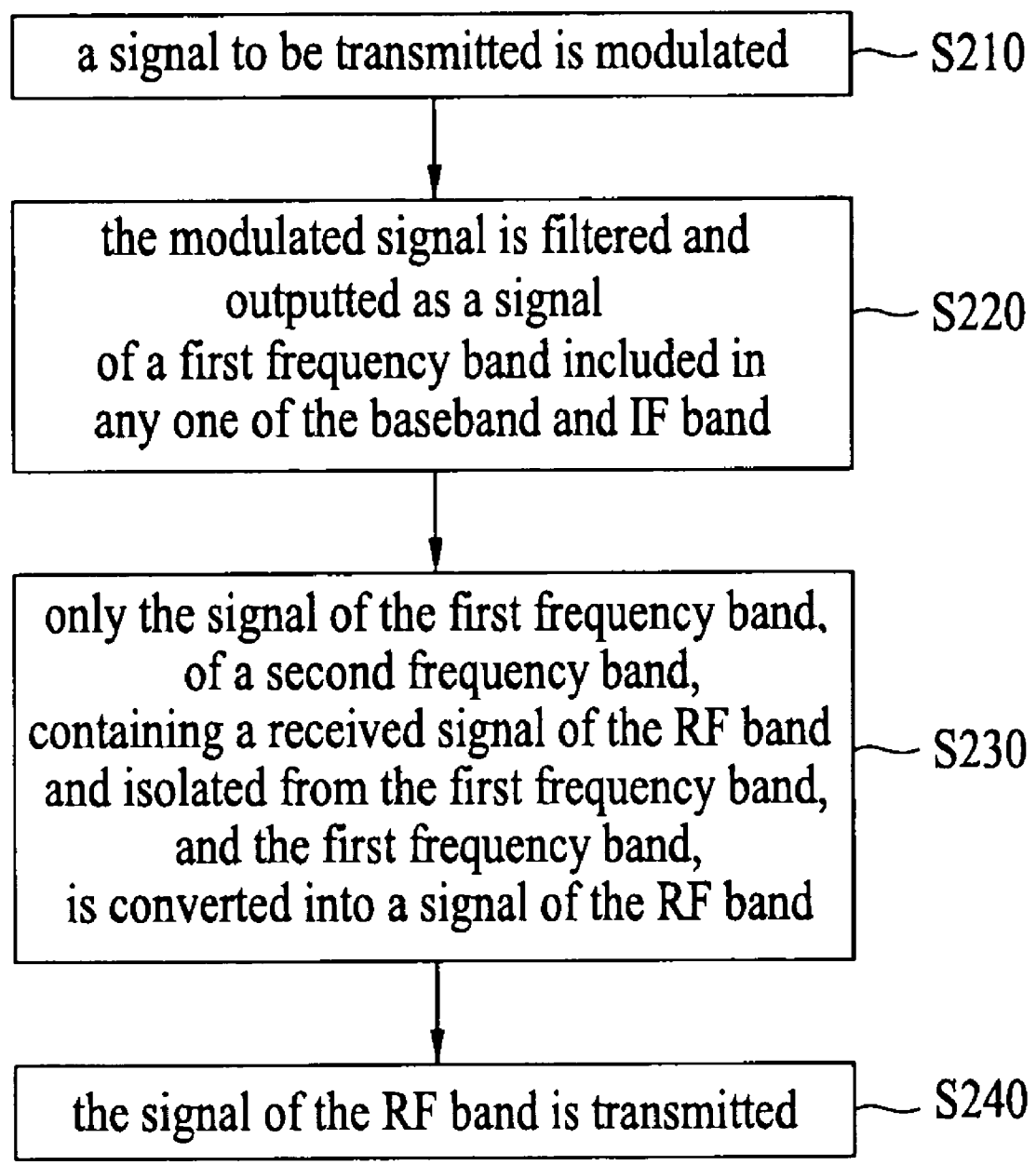
FIG. 35 is a flowchart illustrating a preferred embodiment of an RF signal transmission method according to the present invention.

FIG. 35 is a flowchart illustrating a preferred embodiment of an RF signal transmission method according to the present invention. This embodiment of the RF signal transmission method according to the present invention will hereinafter be described with reference to FIG. 35.

First, a signal to be transmitted is modulated (S210).

The modulated signal is filtered and outputted as a signal of a first frequency band included in any one of the baseband and IF band (S220).

Only the signal of the first frequency band, of a second frequency band, containing a received signal of the RF band and isolated from the first frequency band, and the first frequency band, is converted into a signal of the RF band (S230).

The signal of the RF band is transmitted (S240).

Figure 36:
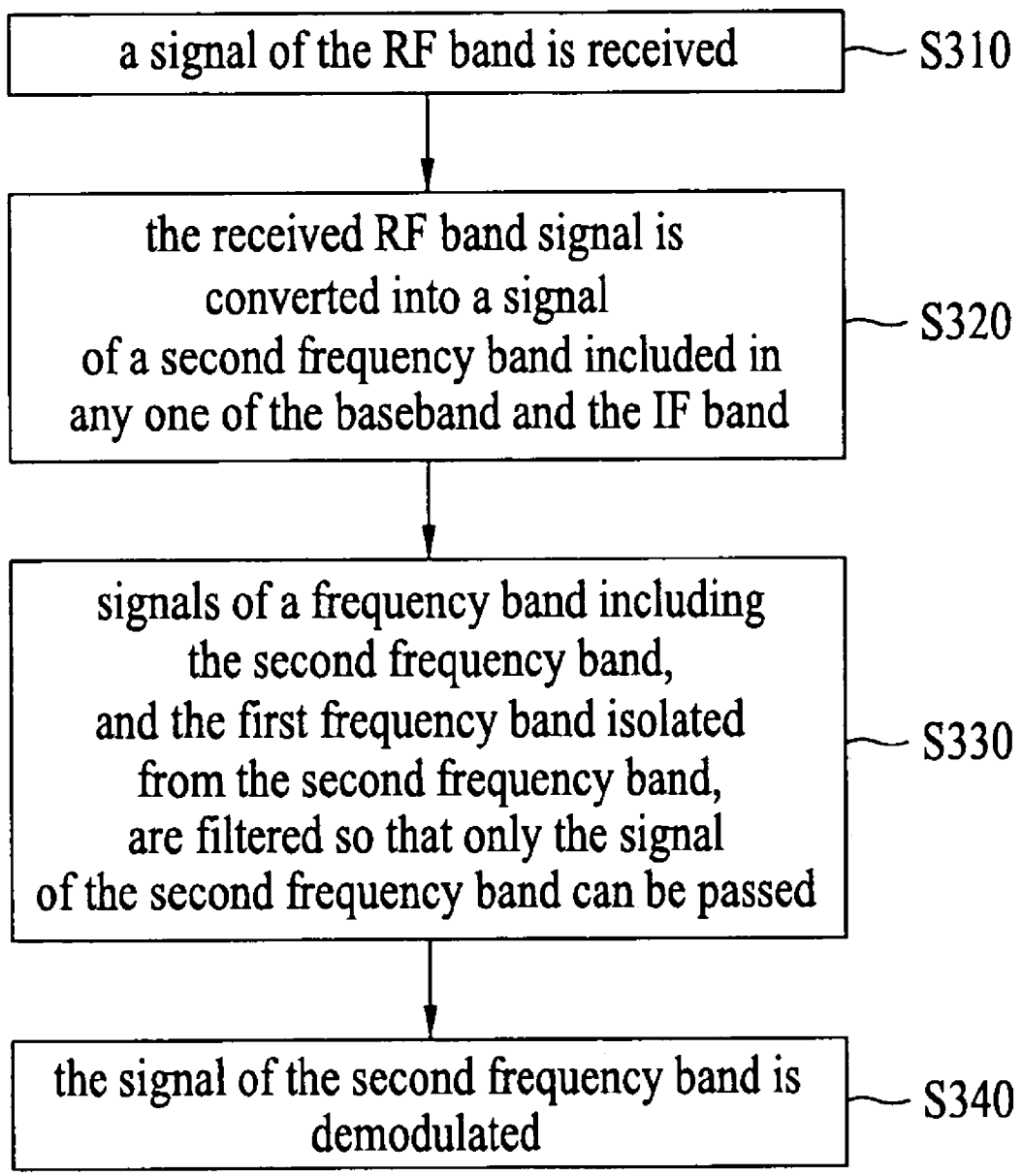
FIG. 36 is a flowchart illustrating a preferred embodiment of an RF signal reception method according to the present invention.

FIG. 36 is a flowchart illustrating a preferred embodiment of an RF signal reception method according to the present invention. The flowchart of FIG. 36 can be readily understood from the embodiment of FIG. 10. The preferred embodiment of the RF signal reception method according to the present invention will hereinafter be described with reference to FIG. 36.

First, a signal of the RF band is received (S310).

The received RF band signal is converted into a signal of a second frequency band included in any one of the baseband and the IF band (S320). The frequency band converted at step S320 may contain a signal for transmitting, and the received signal. Here, the frequency band of the transmitting signal is referred to as a first frequency band.

As a result, signals of a frequency band including the second frequency band, and the first frequency band isolated from the second frequency band, are filtered so that only the signal of the second frequency band can be passed (S330).

Then, the signal of the second frequency band is demodulated (S340).

Figure 37:
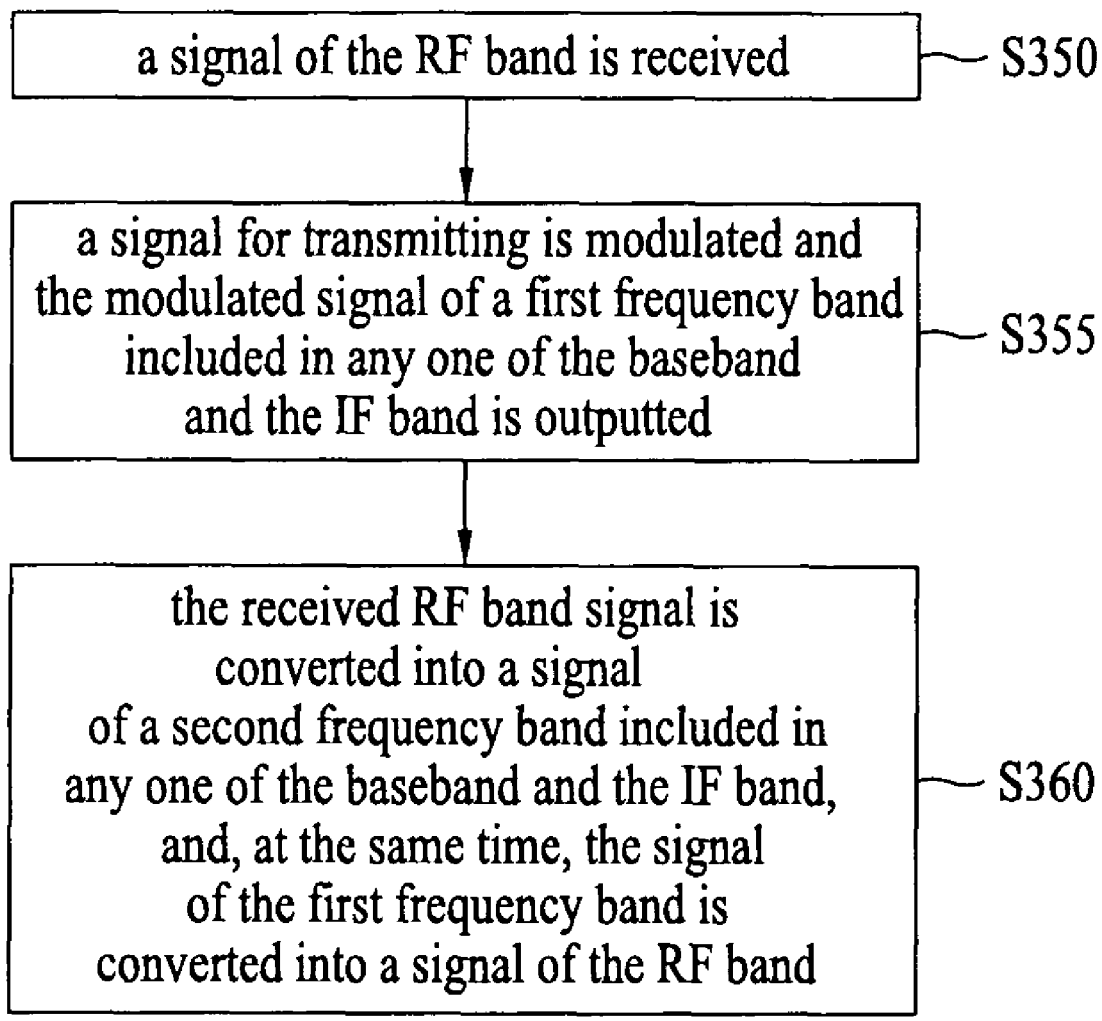
FIG. 37 is a flowchart illustrating a preferred embodiment of an RF signal transmission/reception method according to the present invention.

FIG. 37 is a flowchart illustrating a preferred embodiment of an RF signal transmission/reception method according to the present invention. This embodiment of the RF signal transmission/reception method according to the present invention will hereinafter be described with reference to FIG. 37.

First, a signal of the RF band is received (S350).

A signal for transmitting is modulated and the modulated signal of a first frequency band included in any one of the baseband and the IF band is outputted (S355).

The received RF band signal is converted into a signal of a second frequency band included in any one of the baseband and the IF band, and, at the same time, the signal of the first frequency band is converted into a signal of the RF band (S360). In the embodiment of FIG. 37, both the signal of the first frequency band and the signal of the second frequency band belong to the baseband or IF band, and the signal of the first frequency band and the signal of the second frequency band can be filtered respectively so as to be isolated from each other. According to this embodiment of FIG. 37, a full-duplex function can be performed using signals of the baseband and/or the IF band.

In the embodiments of FIGS. 33 to 35, the full-duplex function can be carried out to transmission, reception and transmission/reception signals.

Figure 38:
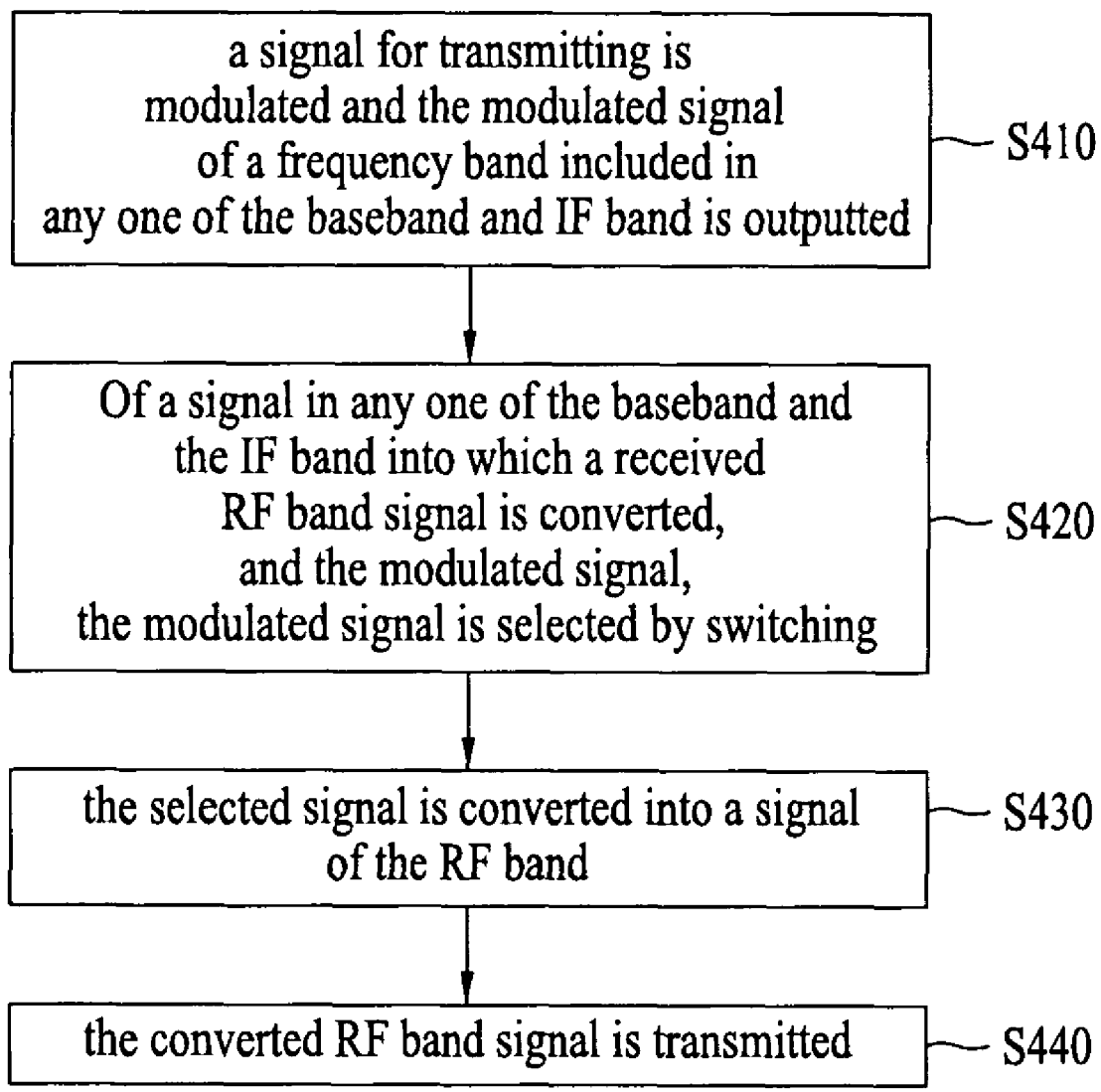
FIG. 38 is a flowchart illustrating an alternative embodiment of the RF signal transmission method according to the present invention.

FIG. 38 is a flowchart illustrating an alternative embodiment of the RF signal transmission method according to the present invention. This embodiment of the RF signal transmission method according to the present invention will hereinafter be described with reference to FIG. 38.

First, a signal for transmitting is modulated and the modulated signal of a frequency band included in any one of the baseband and IF band is outputted (S410).

Of a signal in any one of the baseband and the IF band into which a received RF band signal is converted, and the modulated signal, the modulated signal is selected by switching (S420).

The selected signal is converted into a signal of the RF band (S430).

The converted RF band signal is transmitted (S440).

Figure 39:
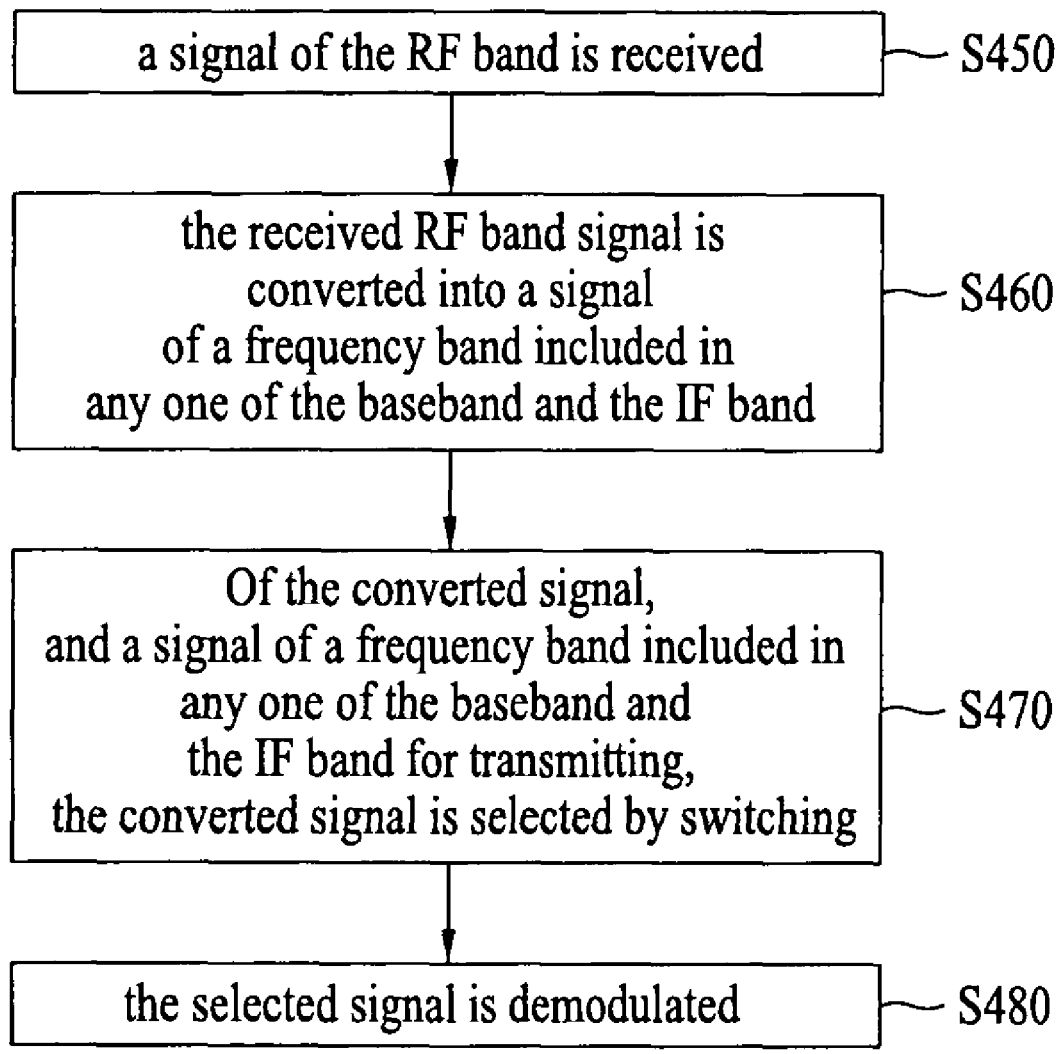
FIG. 39 is a flowchart illustrating an alternative embodiment of the RF signal reception method according to the present invention.

FIG. 39 is a flowchart illustrating an alternative embodiment of the RF signal reception method according to the present invention. This embodiment of the RF signal reception method according to the present invention will hereinafter be described with reference to FIG. 39.

First, a signal of the RF band is received (S450).

The received RF band signal is converted into a signal of a frequency band included in any one of the baseband and the IF band (S460).

Of the converted signal, and a signal of a frequency band included in any one of the baseband and the IF band for transmitting, the converted signal is selected by switching (S470).

The selected signal is demodulated (S480).

Figure 40:
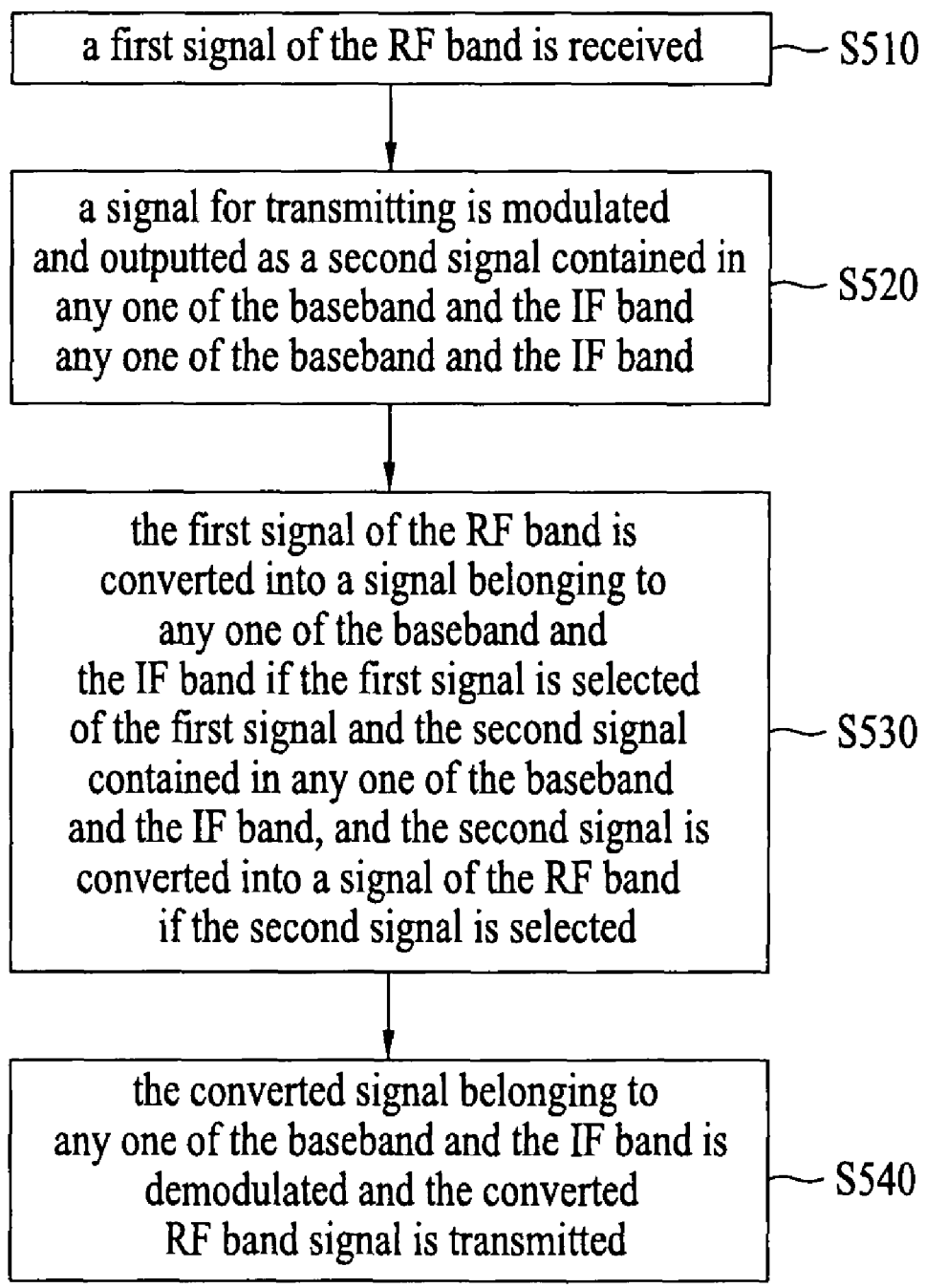
FIG. 40 is a flowchart illustrating an alternative embodiment of the RF signal transmission/reception method according to the present invention.

FIG. 40 is a flowchart illustrating an alternative embodiment of the RF signal transmission/reception method according to the present invention. This embodiment of the RF signal transmission/reception method according to the present invention will hereinafter be described with reference to FIG. 40.

First, a first signal of the RF band is received (S510).

A signal for transmitting is modulated and outputted as a second signal contained in any one of the baseband and the IF band (S520).

The first signal of the RF band is converted into a signal belonging to any one of the baseband and the IF band if the first signal is selected of the first signal and the second signal contained in any one of the baseband and the IF band, and the second signal is converted into a signal of the RF band if the second signal is selected (S530).

The converted signal belonging to any one of the baseband and the IF band is demodulated and the converted RF band signal is transmitted (S540).

In the embodiments of FIGS. 36 to 38, a half-duplex function can be carried out to transmission, reception and transmission/reception signals.

Figure 41:
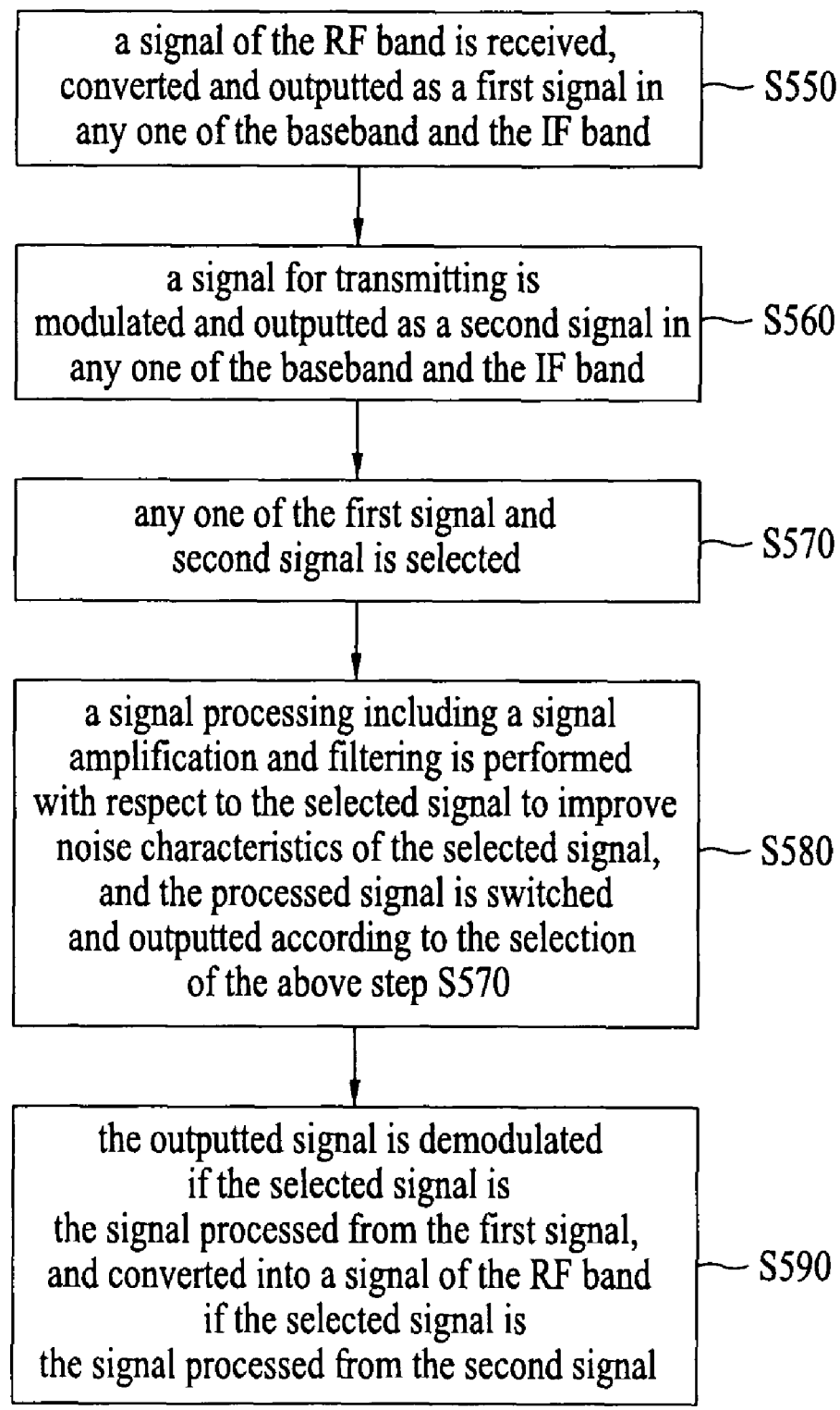
FIG. 41 is a flowchart illustrating another embodiment of the RF signal transmission/reception method according to the present invention.

FIG. 41 is a flowchart illustrating another embodiment of the RF signal transmission/reception method according to the present invention, which can simultaneously process a transmission and a reception signal when the half-duplex function is implemented. In order to facilitate a discriminative description of signals at respective steps, those signals are identified by identifiers "first signal" and "second signal". This embodiment of the RF signal transmission/reception method according to the present invention will hereinafter be described with reference to FIG. 41.

First, a signal of the RF band is received, converted and outputted as a first signal in any one of the baseband and the IF band (S550).

A signal for transmitting is modulated and outputted as a second signal in any one of the baseband and the IF band (S560).

Any one of the first signal and second signal is selected (S570).

A signal processing including a signal amplification and filtering is performed with respect to the selected signal to improve noise characteristics of the selected signal, and the processed signal is switched and outputted according to the selection of the above step S570 (S580).

The signal processing may include a low-noise amplification, filtering, and variable-gain amplification. Alternatively, the signal processing may include all the low-noise amplification, filtering and variable-gain amplification when the first signal is selected, and the filtering and variable-gain amplification when the second signal is selected.

The outputted signal is demodulated if the selected signal is the signal processed from the first signal, and converted into a signal of the RF band if the selected signal is the signal processed from the second signal (S590).

As apparent from the above description, the RF signal transmission/reception apparatus and RF signal transmission/reception method according to the present invention can implement the duplex function using signals of the IF band and/or the baseband. Further, the RF signal transmission/reception apparatus according to the present invention can process a transmission signal and a reception signal at the IF band or baseband to a very high frequency isolation degree based on the filter characteristics of the signal transmitter and signal receiver.

The RF signal transmission/reception apparatus and RF signal transmission/reception method according to the present invention can implement both the full-duplex function and half-duplex function.

In the RF signal transmission/reception apparatus according to the present invention, there is no need to use an expensive RF duplexer, so that the RF signal transmission/reception apparatus can be reduced in cost. Further, the use of no RF duplexer can reduce the size of the RF signal transmission/reception apparatus.

The RF signal transmission/reception apparatus according to the present invention can be implemented by various embodiments wherein the signal receiver and the signal transmitter each employ any one of a low pass filter, band pass filter and high pass filter, and isolate the frequencies of a reception signal and transmission signal from each other using the employed filters.

Further, the RF signal transmission/reception apparatus according to the present invention can process each of a reception signal and a transmission signal in the form of a single ended signal or differential signals, such as an inphase signal and a quadrature signal.

Moreover, the RF signal transmission/reception apparatus according to the present invention can simply implement the duplex function by using a bi-directional mixer. Therefore, power consumption of the RF signal transmission/reception apparatus is small, internal interference of an RF circuit is also small and linearity of signals processed by the transmission/reception apparatus is improved, thereby making it possible to perform a signal processing resistant to external signal interference.

The RF signal transmission/reception apparatus according to the present invention employs no RF duplexer, so that the circuit thereof can be easily designed and the apparatus can be produced at low cost and implemented by a single chip.

In addition, the RF signal transmission/reception apparatus and RF signal transmission/reception method according to the present invention are applicable to wireless LANs (WLANs), cellular phones, or communication devices using a UWB system, Zigbee system, Wimax system, BLUETOOTH system, etc.

Furthermore, the RF signal transmission/reception apparatus according to the present invention is low in cost and simple in structure and is able to reduce inter-signal interference. Also, the RF signal transmission/reception apparatus can be reduced in chip size and be small in output power consumption. In addition, the RF signal transmission/reception apparatus has excellent wireless communication performance and is applicable to various wireless communication systems.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An RF signal transmission/reception apparatus comprising:
    an antenna for transmitting a signal of a radio frequency (RF) band and receiving the signal of the RF band;
    a frequency synthesizer for outputting an oscillation signal of a certain frequency;
    a bi-directional mixer for converting a reception signal of the RF band received through the antenna into a first signal in any one of a baseband and an IF band by using the oscillation signal outputted from the frequency synthesizer and mixing the oscillation signal with the reception signal, and for outputting the converted first signal;
    a first signal selector for selecting the first signal outputted from the bi-directional mixer, and selecting a fourth signal that is sent to the bi-directional mixer to be converted and then transmitted by the antenna as the signal of the RF band;
    a modem for receiving and demodulating a third signal processed from the first signal, and modulating and outputting a second signal in any one of the baseband and the IF band that is different from the first signal frequency band;
    a second signal selector for selecting the second signal outputted from the modem to be processed into the fourth signal, and selecting the third signal processed from the first signal to be sent to the modem; and
    a signal transmitter/receiver unit for receiving and processing the second signal selected by the second signal selector from the modem into the fourth signal and outputting the fourth signal to the bi-directional mixer, and receiving and processing the first signal selected by the first signal selector into the third signal and outputting the third signal to the modem,
    wherein the bi-directional mixer converts the reception signal received by the antenna into the first signal and, at the same time, converts the fourth signal into the signal of the RF band to be transmitted by the antenna, and
    wherein the signal transmitter/receiver unit comprises:
        a low-noise amplifier for low-noise amplifying the first signal selected by the first signal selector;
        a filter for filtering an output signal from the low-noise amplifier; and
        a variable gain amplifier for variably amplifying an output signal from the filter and outputting the amplified signal to the second signal selector as the third signal.

2. An RF signal transmission/reception apparatus comprising:
    an antenna for transmitting a signal of a radio frequency (RF) band and receiving the signal of the RF band;
    a frequency synthesizer for outputting an oscillation signal of a certain frequency;
    a bi-directional mixer for converting a reception signal of the RF band received through the antenna into a first signal in any one of a baseband and an IF band by using the oscillation signal outputted from the frequency synthesizer and mixing the oscillation signal with the reception signal, and outputting the converted first signal;
    a modem for receiving and demodulating a third signal processed from the first signal, and modulating and outputting a second signal of any one of the baseband and the IF band that is different from the first signal; and
    a signal transmitter/receiver unit for processing the second signal outputted from the modem into a fourth signal and outputting the fourth signal to the bi-directional mixer, and processing the first signal outputted from the bi-directional mixer into the third signal and outputting the third signal to the modem, wherein the bi-directional mixer converts the reception signal of the RF band received by the antenna into the first signal and, at the same time, converts the fourth signal into the signal of the RF band to be transmitted by the antenna, and wherein the signal transmitter/receiver unit comprises:
- a low-noise amplifier for low-noise amplifying the first signal outputted from the bi-directional mixer;
- a first signal selector for selecting one of the first signal amplified by the low-noise amplifier and the second signal from the modem;
- a filter for filtering the signal selected by the first signal selector;
- a variable gain amplifier for performing a variable-gain amplification with respect to an output signal from the filter to output at least the third signal or the fourth signal; and
- a second signal selector for performing a switching operation to transfer the third signal outputted from the variable gain amplifier to the modem or to transfer the fourth signal outputted from the variable gain amplifier to the bi-directional mixer.

* * * * *